(12) United States Patent
Jaeger

(10) Patent No.: US 7,356,760 B2
(45) Date of Patent: Apr. 8, 2008

(54) SYSTEM AND METHOD FOR EDITING AN ELECTRONIC DOCUMENT OF TEXT AND GRAPHIC OBJECTS

(75) Inventor: Denny Jaeger, Oakland, CA (US)

(73) Assignee: NBOR Corporation, Oakland, CA (US)

( * ) Notice: Subject to any disclaimer, the term of this patent is extended or adjusted under 35 U.S.C. 154(b) by 177 days.

(21) Appl. No.: 10/940,508

(22) Filed: Sep. 13, 2004

(65) Prior Publication Data
US 2005/0034068 A1 Feb. 10, 2005

Related U.S. Application Data

(63) Continuation-in-part of application No. 10/671,950, filed on Sep. 26, 2003, which is a continuation-in-part of application No. 10/635,704, filed on Aug. 5, 2003, which is a continuation-in-part of application No. 10/054,277, filed on Jan. 24, 2002, now abandoned, which is a continuation of application No. 09/880,397, filed on Jun. 12, 2001, now Pat. No. 6,883,145, which is a continuation-in-part of application No. 09/785,049, filed on Feb. 15, 2001.

(51) Int. Cl.
G06F 17/00 (2006.01)
(52) U.S. Cl. .................. 715/246; 715/243; 715/255; 715/271

(58) Field of Classification Search ............. 715/520, 715/517, 525, 530, 531, 540, 521
See application file for complete search history.

(56) References Cited

U.S. PATENT DOCUMENTS

| | | | | |
|---|---|---|---|---|
| 5,745,910 | A | * 4/1998 | Piersol et al. | ............... 715/515 |
| 5,895,476 | A | * 4/1999 | Orr et al. | ............... 715/517 |
| 2002/0078098 | A1 * | 6/2002 | Shirai | ............... 707/517 |
| 2004/0205624 | A1 * | 10/2004 | Lui et al. | ............... 715/525 |
| 2005/0091585 | A1 * | 4/2005 | Parikh et al. | ............... 715/517 |
| 2006/0150093 | A1 * | 7/2006 | Chen | ............... 715/518 |

OTHER PUBLICATIONS

Microsoft, "Word 2000 Screenshots", Dec. 31, 1999, Word 2000, pp. 1-18.*

* cited by examiner

*Primary Examiner*—Stephen Hong
*Assistant Examiner*—Adam L Basehoar

(57) ABSTRACT

A system and method for editing an electronic document of text and graphic objects utilizes first and second display objects to separate the graphic objects from the text to provide a user with control of the layout of the electronic document. The separation of the text and the graphic objects may involve removing the graphic objects from the first display object and placing the objects in the second display object.

27 Claims, 18 Drawing Sheets

SYSTEM AND METHOD FOR EDITING AN ELECTRONIC DOCUMENT OF TEXT AND GRAPHIC OBJECTS

REFERENCE TO RELATED APPLICATIONS

This application is a continuation-in-part of U.S. patent application Ser. No. 10/671,950, filed Sep. 26, 2003, which is a continuation-in-part of U.S. patent application Ser. No. 10/635,704, filed Aug. 5, 2003, which is a continuation-in-part of U.S. patent application Ser. No. 10/054,277, filed Jan. 24, 2002, now abandoned which is a continuation of U.S. patent application Ser. No. 09/880,397, filed Jun. 12, 2001 now U.S. Pat. No. 6,883,145, which is a continuation-in-part of U.S. patent application Ser. No. 09/785,049, filed Feb. 15, 2001, for which priority is claimed. The entireties of the prior applications are incorporated herein by reference.

FIELD OF THE INVENTION

The invention relates generally to the field of word processing, and more particularly to a system and method for editing an electronic document of text and graphic objects.

BACKGROUND OF THE INVENTION

Modern word processing approaches have evolved from traditional text concepts, such as line width (or page width minus left and right margins), line height (generally expressed as font size in points) and line spacing (generally expressed as single, double or triple line spacing). In virtually all word processing programs these parameters control the presentation of text, and this approach has sufficed for many uses. Line spacing in the vertical direction is thus limited to individual settings of font size and line spacing intervals. When graphic objects (such as graphics, photos, formulae, and the like) are introduced into a text field, some word processing programs react by defining an object space that is equal to an integer multiple of the line spacing set for the text field. This spacing may be awkward or inapt, given that the preset line spacing may not permit balanced spacing above and below the object, or may be too great or too small in proportion to the object size. Text wrap functions are present in some applications that allow a lateral spacing effect in which the text lines approach to within a minimum preset lateral distance to the graphic object.

However, the advent of page layout systems, graphic programs, and the like have complicated the task of spacing objects onscreen. Some graphic programs enable spacing objects by selecting them and activating a spacing function that creates equal spacing of the objects, in either Cartesian direction. These functions generally do not work well, or at all, with mixed text objects and graphic objects, nor do they enable spacing a graphic object among the lines of a text object. Nor are these applications capable of respacing a collection of graphic objects when one of them is resized or moved, without first reselecting the group and commanding a new spacing routine. Nor are they capable of respacing lines of text when an interposed graphic object is resized. Thus the prior art software applications are limited in their functions and usefulness.

Another problematic aspect of graphics application involves multiple onscreen objects and more specifically a situation in which multiple objects are positioned and depicted one atop the other. The general rule is that the object currently occupying the uppermost layer (virtual vertical position) in the depiction is available to be selected and moved or otherwise activated by positioning the cursor and clicking on the topmost object. However, it is often the case that the user may wish to select an onscreen object below the topmost object, and can visualize the desired object in the depiction, yet cannot select it because of the presence of a superjacent object. Generally, there is no way to provide "touch transparency" in prior art graphics programs. "Touch transparency" is defined herein as the ability of an onscreen object in a vertical arrangement of multiple objects to transfer any mouse click thereon to an onscreen object below it (subjacent in the vertical order of the multiple objects). Rather, the user must adjust the layering of objects and groupings of objects, using UP/DOWN commands in a pulldown menu or manipulating the numerical order of the vertical arrangement. These techniques are awkward and time-consuming, making it difficult to establish the vertical ordering that yields the desired depiction and desired selection.

Another problematic aspect of conventional word processing or graphics programs is that a graphic object of an electronic document typically "jumps" to an adjacent page, which can be previous or subsequent page, when that graphic object is moved across a page break due to editing of the electronic document, such as adding or deleting of text. This causes havoc on the layout of the electronic document, since the jumping of the graphic object causes text and other graphic objects to be moved by the same distance, which significantly modifies the document layout. Furthermore, the jumping of the first graphic object may cause other graphic objects to "jump" as well, which further causes the layout of the electronic document to be modified.

In view of these concerns, there is a need for a method and system for editing an electronic document of text and graphic objects that allows a user more control with respect to the layout of the electronic document.

SUMMARY OF THE INVENTION

A system and method for editing an electronic document of text and graphic objects utilizes first and second display objects to separate the graphic objects from the text to provide a user with control of the layout of the electronic document. The separation of the text and the graphic objects may involve removing the graphic objects from the first display object and placing the objects in the second display object.

A system in accordance with an embodiment of the invention includes a display device and an editing module. The display module is configured to display an electronic document of text and graphic objects in a first display object. The graphic objects are positioned in spaces in the text of the electronic document. The editing module is configured to create a second display object and separate said graphic objects from said electronic document such that said graphic objects are positioned in one of said first and second display objects and said electronic document is positioned in the other display object of said first and second display objects. The editing module is further configured to place at least one of said graphic objects back in said spaces in said text of said electronic document after said electronic document has been modified.

A method in accordance with an embodiment of the invention includes displaying an electronic document of text and graphic objects in a first display object, the graphic objects being positioned in spaces in the text, creating a second display object, including separating the graphic objects from the electronic document such that the graphic objects are positioned in one of the first and second display objects and the electronic document is positioned in the other display object of the first and second display objects, and selectively placing at least one of the graphic objects back in the spaces in the text of the electronic document in the other display object.

A method in accordance with an alternative embodiment of the invention includes displaying an electronic document of text and at least one graphic object, modifying the electronic document such that at least a portion of the graphic object is displaced across a predefined line, and splitting the graphic object between adjacent pages based on the portion of the graphic object.

In one embodiment, the invention comprises a storage medium, readable by a computer, tangibly embodying a program of instructions executable by the computer to perform the method steps for editing an electronic document of text and graphic objects.

Other aspects and advantages of the present invention will become apparent from the following detailed description, taken in conjunction with the accompanying drawings, illustrated by way of example of the principles of the invention.

DETAILED DESCRIPTION OF THE INVENTION

Figure 1:
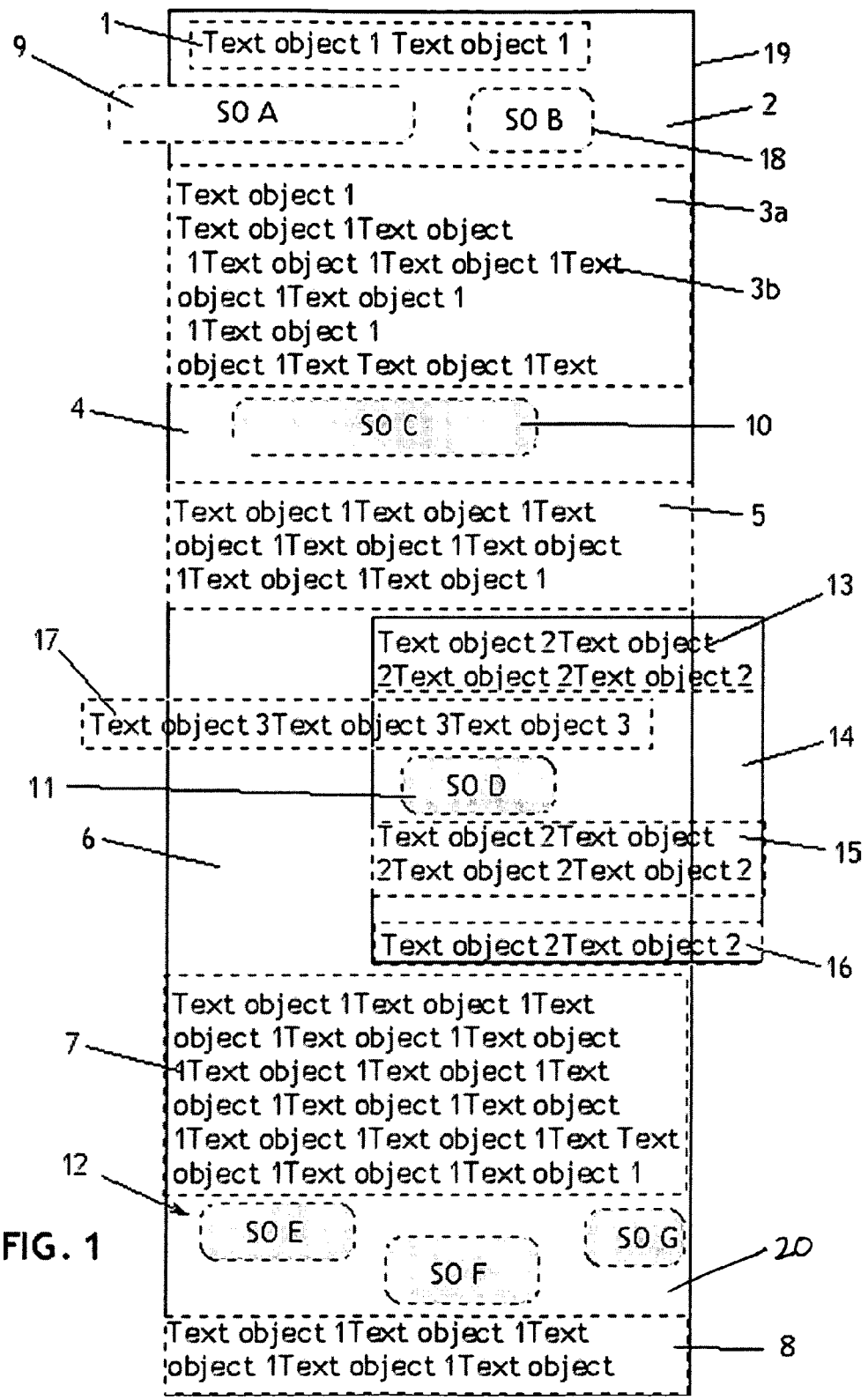
FIG. 1 is an example of spacing tasks involving mixed graphic objects and text objects that are carried out by the Allow Ripple function of the present invention.

The present invention generally comprises a method for depicting onscreen objects and, more particularly, to a method for altering the spacing of onscreen objects as they are moved, resized, or added or removed from a depiction. The invention also comprises a method and system for editing an electronic document of text and graphic objects.

The following terms used herein are defined as follows:

BLACKSPACE ENVIRONMENT presents a computer working environment having one universal working or drawing surface that is shared by all graphic objects within the environment. Each of these graphic objects can have user-created relationships to any or all of the other objects. Text objects are treated the same as any other graphic object. The term "BLACKSPACE" is a trademark of the NBOR Corporation.

VDACC OBJECT is a recognized object that denotes a bounded area on a computer display that manages one or more graphic objects that exist on the Blackspace universal working or drawing surface. VDACC is an acronym for Visual (or Virtual) Display and Control Canvas. Graphic objects may be contained within a VDACC object, together with the user-created relationships therebetween and with graphic objects outside the VDACC object or in another VDACC object. The graphic objects and these relationships may be saved and recalled, along with their exact layout, within any VDACC object. Any VDACC object can accommodate and facilitate any operation that the computer may perform, such as, but not limited to, text processing, graphics processing, audio and video editing and playing, picture display and cropping, and the like. The term "VDACC" is a trademark of the NBOR Corporation. For more information about VDACC objects, see pending U.S. patent application Ser. No. 10/671,953, entitled "Intuitive Graphic User Interface with Universal tools", filed on Sep. 26, 2003, which is incorporated herein by reference.

LAYOUT CHANGE—A change in the onscreen appearance or spacing of one or more graphic objects.

ALLOW RIPPLE—A property of all graphic objects which enables graphic objects to be spaced apart from nearby objects in a recursive manner that accounts for changes in size, number, and location of the objects. Allow Ripple may be set ON or OFF: If set to OFF for a graphic object, that object is excluded from all Ripple operations; If set to ON, the object is included in all Ripple spacing operations within it's ENSEMBLE (see blow)

[RIPPLE]ENSEMBLE—A list of graphic objects for which Ripple actions are to be calculated and applied when one or more objects in the list undergo a change of layout. A graphic object may be in only one Ensemble at any one time. An example of a Ripple Ensemble is the list of objects with Allow Ripple enabled in a VDACC object. An Ensemble can be implemented in any environment, such as a VDACC object or in Primary Blackspace surface.

INTERACTIVE GEOMETRY[IG]—The property or properties of a graphic object which determine(s) its area of screen available for user interaction with it via a pointing or other user input device.

SIMPLE Interactive Geometry (Simple IG)—The IG of a graphic object within the system which is always adequately defined by the bounding rectangle of the object or a single closed polygon enclosing its extent on the screen.

COMPLEX IG—The IG of a graphic object within the system which may include multiple closed polygons within its extent on the screen. Furthermore a complex IG may include other properties which may affect the IG of a graphic object at any time whilst the system is active.

DOMAIN—A graphic object with Allow Ripple turned ON, which may have, within the system, a Complex IG as described above. A Domain will generally have an IG which is comprised of multiple rectangular or polygonal IGs. As such, Domains may undergo IG changes which alter the complex IG but do not necessarily alter the simple IG. Furthermore, changes to the IG of a Domain may result from changes to its properties which are not explicitly concerned with its IG. An example of a Domain is a Text Object.

DOMAIN TO NOTIFY—the Domain(s) which contains a graphic object whose layout has been changed. This graphic object must have a complex geometry. For example, when a simple object (e.g. a circle) has changed is geometry within a text object and the text object qualifies as a Domain for the circle, then the text object is a Domain to Notify. Moreover, when the text object just described responds to the circle's geometry change by changing its own geometry, the Domains for the text object which are found, e.g., those objects with complex geometry and that enclose it vertically, become the Domain to Notify for the next iteration of the process.

VILLEIN—A graphic object with Allow Ripple turned ON which, at the instant of a particular Layout Change is identified at that instant as falling within the influence or 'jurisdiction' (for Auto-layout purposes) of a Domain or Domains (as described above). As such, it does not itself respond autonomously to the Layout Change, geometrically or otherwise, but delegates the determination and implementation of changes to its properties to the Domain or Domains as determined (for this change) as described above. Any graphic object can at any time be treated as a Villein by the system when evaluating a Layout Change, regardless of whether it is also currently a Domain. From the antiquated definition: in feudal England, any member of a class of serfs, or peasants, who by the thirteenth century had become freemen in their legal relations to all others except their lord, to whom they remained entirely subject as slaves.

The Ripple operation is a method for spacing onscreen objects using a recursive process. There are three aspects to Allow Ripple:

1. Basic Allow Ripple
2. Allow Ripple for a single complex object containing other objects.
3. Allow Ripple for one or more complex objects that intersect other complex objects and that delegates the further detection of intersection objects to another complex text object in a recursive behavior.

Basic Allow Ripple (AR) In basic AR, objects are judged by their bounding rectangles and no attention is paid to their internal geometries. One example involves resizing an object and respacing nearby objects to accommodate the change in object size. Noting that an Ensemble is a list of things (objects) which are to be affected by Allow Ripple, if one of these objects is resized then all the remaining objects in the Ensemble will be examined and the decision to apply Ripple to each of them will be resolved.

The AR routine first determines which objects in the Ensemble list are included in Allow Ripple (which objects have Allow Ripple turned on). Then it goes through its list of graphic objects and it finds the object that has been resized. The list is organized with the object at the top of the document ("top" denoting the maximum Cartesian Y direction) at the top of the list. Then each object that has been added below the top of this first object is next on the list. The Ensemble goes down its list and finds the object that has been resized. Then for instance, according to the behavior as described in the flow chart, all objects below the object that has been resized are moved down by the same distance that the object has been resized. If the object has been resized up, then all objects above it are moved up by the distance that the object has been resized. NOTE: only objects that have AR turned on in their menu or Info Canvas object will be automatically moved. However, Objects that do not have AR turned on in their menus or Info Canvas objects will not be moved. An Info Canvas object is a menu associated with any object in the Blackspace computer environment. Properties and functionalities of an object can be modified using entries in the associated Info Canvas object. For more information about Info Canvas objects, see pending U.S. patent application Ser. No. 10/671,953, entitled "Intuitive Graphic User Interface with Universal tools", filed on Sep. 26, 2003.

This operation is done on successive mouse messages. As far as the user is aware, this operation of auto-respacing of objects appears to happen immediately upon the resizing of an object that exists in an Ensemble. Every time the mouse moves, the old size of the object which is being resized is calculated as compared to the new size and this distance is added to the position of all objects that have AR turned on for them and that are either above or below the resized object, depending upon which direction the object is being resized. Note that the Ripple operation happens automatically if Allow Ripple is turned on, unlike prior art spacing routines in which objects must be selected and commanded to be spaced apart on a singular, non-recurring basis. Note also that the Ripple operation functions in the lateral direction (the Cartesian X direction) as well as vertically.

With regard to FIG. 1, the text object 1 is a complex object that consists of various geometries and vertical spaces. For instance, text portions 3, 5, 7 and 8 are all parts of this single complex text object, which may have been separated by entering line returns, or by the use of a staircase spacing tool, as described in copending application Ser. No. 10/635,704, filed Aug. 5, 2003, which is incorporated herein by reference. In between each of these portions are spaces such as 2, 4, 6 and 20. In these spaces other objects may be placed, such as object 9 in space 2, object 10 in space 4, multiple objects 13-17 in space 6, and objects 12 in space 20. Such objects could be recognized objects like stars, squares, triangles or the like, or may be drawings, buttons, pictures, etc.

The spaces in text object are the parts that are not enclosed by the dotted lines. The solid line 19 is the external or "simple" geometry boundary of text object 1.

A text object is of a class of objects that are referred to as Domain capable or that have a complex internal geometry. The dotted lines illustrate the internal geometry of text object 1. The dotted lines indicate the sub-geometries which the object maintains within itself—they are part of the object definition of text object 1. Referring to the second sub-geometry of text object 1 (portion 3*a*), if a user places the text cursor at the end of the text line at position 3*b* and then presses the Enter key, a new line will be added to the portion 3*a*. If no text is typed then this will be an added space. If text is typed then this will be an added line. Either way, the height of one line of text is being added to portion 3*a*.

In this particular example everything else would be considered a Villein to the Domain of text object 1. Thus when the user places a text cursor at 3*b* and hits the Enter key or Return key or its equivalent, an analysis is performed. In this example the Domain is text object which includes all of the various portions of the text object and the spaces therebetween. What defines this object as a Domain is the fact that it is capable of having a COMPLEX GEOMETRY. Referring again to this figure, text object has other objects which either intersect it or are enclosed by it.

A Domain is identified by two things:
A. Whether it is capable of a complex internal geometry.
B. Whether it intersects or encloses any other objects.
  This determination is performed by the software every time a user resizes, for example, text objector any object that is either enclosed by it or that intersects it.

NOTE: When a user drags to resize an object that is either enclosed by a complex object or that intersects it, the calculations as described above are immediately performed, even if the user drags a distance of one pixel. If the user drags a pixel or two and then drags another pixel or two, for each drag which resizes an object as just described, the calculations are performed as described above.

Within the example of FIG. 1 a Villein is any object that is either enclosed or that intersects an object that for this operation has been designated as a Domain. With regards to FIG. 1 and further regarding the current iteration of the Rippling process, namely the resize operation of sub-geometry 3*a* as described above, every other object in FIG. 1 will be a Villein for this iteration of the Rippling process.

In this case identifying the Villeins involves determining the vertical intersection of any object with text object 1. All of the objects shown in FIG. 1 are vertically enclosed by text object 1. They are not all horizontally enclosed. For example, SIMPLE OBJECT A (reference numeral 9) and Text object 2 (reference numeral 13) and text object 3 (reference numeral 17) are not horizontally enclosed. Their external geometry extends laterally beyond the external geometry of text object 1.

The fact that text object is capable of supporting a complex geometry and that other objects are either enclosed by or vertically intersect with text object 1 means that in this process (the current Ripple process as caused by placing a text cursor at 3*b* and hitting the Enter key), the current analysis (this pass) identifies a Domain and all other objects that either vertically intersect text objector that are enclosed by it are Villeins.

After the Domain and Villeins are identified for this iteration of the Ripple process, every item that is identified as a Villein is taken out of the Ensemble. The Ensemble is informed that there has been a geometry change within the ensemble and that is when the simple ripple as described under section above (Basic Ripple) occurs. The software detects that the size of portion 3*a* of text object has changed. A space has been added below this sub-geometry at point 3*b*. At this point the bottom of sub-geometry 3*a* will be overlapping object SIMPLE OBJECT C 10. In response, the software routine determines that all Villein objects below this point will be moved down. The external boundary 19 of text object will change, and the bottom line below portion move down by a distance that equals the height of the text line that is added at 3*b*. This is the end of this pass.

An important aspect of the previous example is that there are two passes involved. The first pass involves objects moved by the Domain, in this case text object 1 (1). Then there is a further stage to the completion of the Ripple which is the simple Ripple that extends the bottom boundary of text object 1.

The example of FIG. 1 illustrates the case of a vertical ripple. Horizontal ripples are also possible and operate essentially the same way as vertical ripples.

When an object's geometry is changed by whatever method (for example by resizing the object or by editing text—adding or subtracting one or more lines to the text), then the Villein searches for its enclosing Domain. This can be illustrated in the following manner. If a user places a text cursor somewhere in text object 3 (17) and types additional text with a carriage return (hitting the Enter or Return key) such that another line is added to this text, the text is now two lines. That is, the vertical height of this text object 3 is increased by one line. In this case Text object 3 will not be recognized as a Domain since it has no objects that are vertically enclosed by it. In other words, no objects have been placed within one or more of its internal vertical spaces. For practical purposes, it has no vertical spaces to place an object into.

When a second line is added to Text object 3 this will cause Text object 3 to increase its boundary size by extending downward a distance of one text line. This action causes the Ripple routine to evaluate the Domain of Text object 3, which is Text Object 2 (13). Text Object 2 becomes a Domain to Notify. What the routine looks for is the smallest (height-wise) object having a complex geometry and vertically enclosing Text Object 3 (17). For this example, Text object 3 is vertically enclosed by both text object and text object 2. Of these two, text object 2 has the smallest height, simple object this is recognized as the domain of text object 3. This selection illustrates a key aspect of the recursion process. In other words, Text object 3 (17) looks for the vertically smallest (i.e. that with least height) object with a complex geometry that encloses it. In this case it finds Text Object 2 (13). "Encloses it" means that Text Object 3 (17) vertically intersects Text Object 2 where the top of Text Object 3's bounding area lies below the top of Text Object 2's bounding area and Text Object 3's bottom bounding area is above Text Object 2's bottom bounding area.

Regarding the term "complex geometry," this is not limited to text objects. An object that has a complex geometry is an object that has internal layout which may be changed in a non-linear way. In other words, part of the geometry (sub-geometry) of the object can change without changing other parts of the geometry of that same object. Another way of thinking about a complex object, is that a complex object is something that has a property that enables part of its screen appearance to change whereby other parts of its screen appearance remain the same. Thus a complex object could be a group of "glued" or grouped objects. Where this glued group of objects has the property that one or more of the glued objects can have their geometry changed without changing the geometry of other objects in the group.

For instance, if four circles are glued together side by side, and one circle is stretched to increase its width without increasing the width of the other three circles, this would be an example of a glued object with a complex geometry.

Returning to the example of the edit made in Text object 3 (17) to increase its height by the distance of one line height. The Ripple process determines that the relevant Domain is Text Object 2 (13). If no Domain were detected for Text object 3, then process transfers immediately to the Ensemble-the top level geometry. If Text object 2 were not recognized as the relevant Domain, in this example as shown in FIG. 1, the Ripple routine would find Text Object 1, which is the next larger Domain, which would then become the Domain to Notify. If there is no intersection with any complex object, then Text object 3 will inform the Ensemble —the top level—and a simple ripple would occur.

Since it does find an enclosing Domain (Text object 2), the Ripple routine first acts on Text object 2. Then Text object 3 delegates any further rippling action to Text object 2 (13). At this point, Text object 3 (17) undergoes no further action.

NOTE: If Text object 3 was typed into a VDACC object and it did not vertically intersect any complex objects, then when a second line was added to the text object, it would simply increase its vertical size by the height of one line downward. It would then inform the Ensemble which is contained within the VDACC object, that its geometry has changed. Then from that point on the Rippling would be strictly simple, using external geometries as described above.

Text object 3 interacts directly with Text object 2 and in effect informs it of its geometry change. Once an object has identified its Domain, the software gives the object the ability to interact directly with its Domain. Once the geometry change of Text object 3 has been linked with Text object 2, Text object 2 analyzes this geometry change. Regarding FIG. 1, the simple object software routine recognizes that the geometry change for Text object 3 has increased the vertical height of bounding rectangle around Text object 2 by the height of one line. In response, the size of Text object 2 is changed to accommodate the change in Text object 3. As a result, portions 15 and 16 of Text object 2 will be moved down a distance equal to one line height. The ripple routine detects that the text portion 13 has not moved down, but its two related portions 15 and 16 have moved down. The routine then seeks the Villein objects whose bottom edges were below the top edges of portions 15 and 16 before their downward movement.

At this point the software has generated a change in the complex geometry of Text object 2 (13). The software analyzes this change as though Text object 2 had generated this changed itself (the change being delegated to it from Text object 3—the change in its geometry from adding a vertical line to it by hitting a carriage return). In this continuing example, the Ripple routine next analyzes Villeins that are affected by the change in text portion 17, and will find simple object D (11). Then this Villein is moved down by the same distance, namely one vertical line space.

The Ripple routine reiteratively analyzes the Ensemble, and deals with the enlarged boundary of Text object 2 that was caused by the vertical expansion of Text object 3. It once again looks for the relevant Domain and finds that Text object 1 vertically encloses it, at which point Text object becomes a Domain to Notify. The process reiterates to once again enlarge the lower vertical extent of text object 1 to accommodate the expansion of text object 2 and the downward movement of portions 15 and 16.

At this point, as far as the main top level Ensemble is concerned Text object 3 and simple object D (11) will have been temporarily removed from consideration. By the end of iteration which is about to start for Text object 1, Text object 2 will have also been removed as well as simple objects A (9), B (18), C (10), E, F and G (12).

Text object 2 reports that its external geometry has changed, namely, its bottom has been moved down by one line height. Text object finds all of its Villeins, which is everything in FIG. 1 except Text object 1. It analyzes which parts of it sub-geometries need to be moved down. In this case, it is sub-geometries (7) and (8). Then these sub-geometries are moved down by the distance of one line height.

These are the only things that are within the geometry of Text object 1 that are below the geometry change in Text object 2. Then Text object will determine that simple objects E, F and G (12) need to be moved down by the same amount.

This recursive behavior continues until all objects have been moved sufficiently to eliminate the need for further Ripple operations. Recursive processing is a significant factor in the invention to determine the relocation of objects and boundaries that is appropriate for changes made by the user or made by other processes carried out by the computer.

The vertical spaces that exist, for instance, in Text object are just counted as space. With a text object it may or may not have text returns in it, but if they are present, then for Allow Ripple, and for most user mouse actions, they are treated as space. In a Blackspace text object, there is just space. This is just screen space. The sub-geometries of a text object, e.g., Text object 1, are the geometries of the visible text fragments that make up that text and the spaces therebetween. These spaces are strings in the code that are stored as part of a text object. Each text object contains a very complex and detailed description of both the content of the text and its formatting. Because vertical (and also object horizontal spaces beyond 2 spaces as defined by the average width of a character being used in a sentence, word, etc.) spaces are not governed by the geometry of the fonts used to create the text, these spaces can be altered on a pixel by pixel basis without having to alter the fonts used to create the text object.

Figure 2:
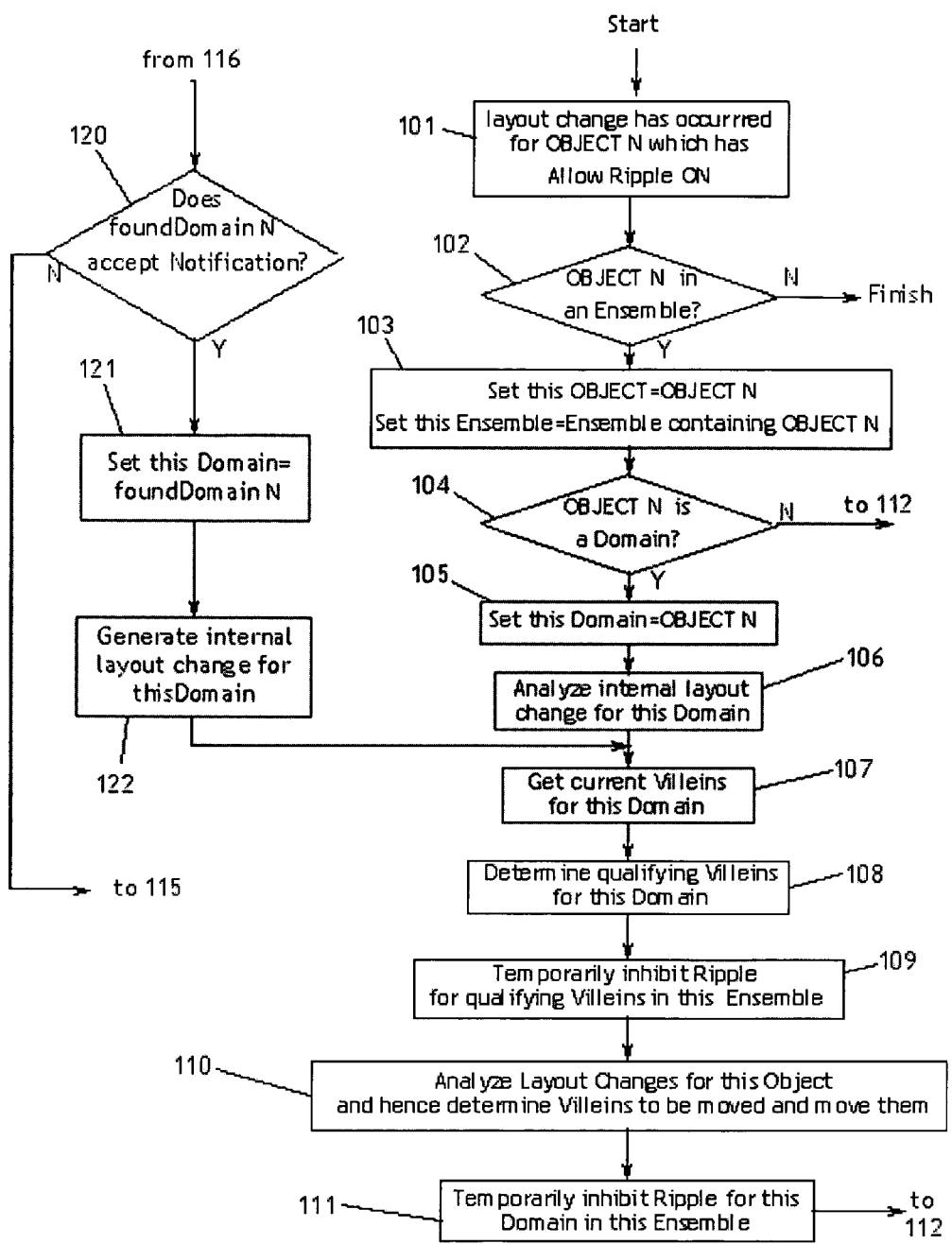
FIGS. 2 and 3 are related portions of a flow chart depicting the operation of the Allow Ripple function for onscreen graphic objects and text objects of the present invention.
Figure 3:
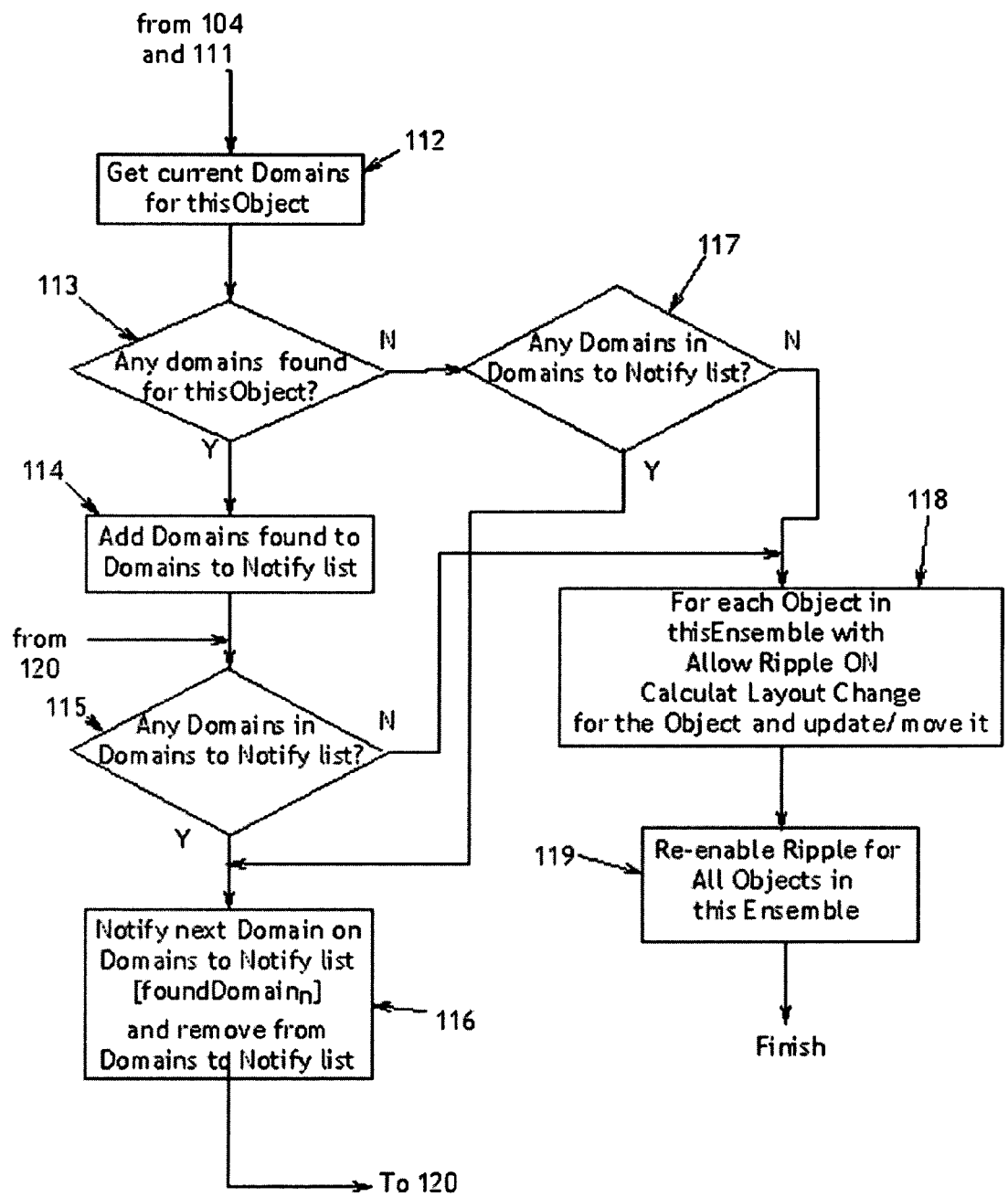

The process described above with reference to FIG. 1 is depicted as a flow chart in FIGS. 2 and 3. Beginning at the Start, at 101 a layout change has occurred for Object N. Object N is any object for which a geometry change has been performed, usually, but not necessarily as a result of user input. At 102, the routine tests if Object N is in an Ensemble. Usually the current screen position of the object will expedite the searching of any extant Ensembles. If yes, the routine at 103 will set the Object and Ensemble for which the overall Ripple process is to be performed, until set otherwise. The routine at 104 determines if Object N is a domain and, if yes, at 105 sets this domain for which the 'Domain-level' processing is to be performed to be Object N, until set otherwise.

The routine at 106 then analyzes the internal layout change for this Domain as instigated by user input or other triggers. At 107 it then gets the current Villein for this Domain. This is usually determined by testing for vertical enclosure of a potential Villeins by the simple external geometry of the Domain. Then at 108 the routine determines qualifying candidate Villeins according to other individual or esoteric considerations. The routine at 109 then temporarily inhibits the Ripple operation for qualifying Villeins in the Ensemble being processed. Thereafter the routine at 110 analyzes the layout changes for this Object and determines which Villeins should be moved and moves them a calculated distance.

At 111 the Ripple routine temporarily inhibits the Ripple operation for the Domain (Object N) in the Ensemble being processed and proceeds to operation 112 (FIG. 3) to get the current Domain for this Object (Object N). This step also follows step 104 if the Object N is not a Domain. If any Domains are found for Object N in step 113, then these Domains are added to the 'Domains to Notify' list in step 114. At step 115 the routine determines if this list contains any entries and, if simple object, at step 116 it notifies the next Domain on the list and removes it from the Domains to Notify list. It then proceeds to step 120 (FIG. 2) to determine if the found Domain N accepts notification at this time. If yes, it sets this Domain as the found Domain (at step 121) and at step 122 generates internal layout change for this Domain, and then loops back into the routine at step 107 to get the current Villeins for this Domain. This is a recursive loop. At step 120 if the found Domain does not accept notification the routine returns to step 115 and looks at the 'Domains to Notify' list once again.

At step 113 if no Domains are found for this Object the routine proceeds to step 117 and looks for any Domains on the 'Domains to Notify' list. If there are more Domains on the list, the routine returns to step 116 to process the next Domain on the list. If no more Domains are on the list, it proceeds to step 118 and calculates the layout change for each Object remaining in the Ensemble (i.e. those not temporarily removed) that has Allow Ripple set On, and carries out the layout changes. Thereafter Ripple is re-enabled for all Objects in this Ensemble, and the routine is finished.

The Ripple process enables far greater freedom in using text that is possible in prior art word processing or graphics programs. For example, it is possible to have text objects within text objects that are within text objects, and modifications to any one of these text objects can be accommodated easily by the Ripple process. This makes possible the creation of tables of data without requiring the rigid rules and conditions (i.e., pre-selecting the number and size of columns and rows before entering data) of prior art applications, merely by placing text objects side-by-side and using Allow Ripple to generate the optimum spacing and layout for the table. Likewise, mixing graphic objects within a table becomes a trivial task, rather than a layout nightmare, by using the Ripple routine to preserve the spacing of text objects and graphic objects when removing existing Objects, editing their appearance or content, or adding new Objects.

The sub-geometries of the onscreen objects are really objects unto themselves that belong to a larger complex object, and are recognized and processed by the Ripple routine. Judging the geometries dynamically according to an object's current state which includes its sub-geometry and its relationship to one or more objects in the system is an important aspect of the invention. Text space is an example of this, as are dynamic wire frame objects; making a wire frame object touch transparent within its defined perimeter (the space inside its perimeter line which constitutes the wire frame) only when it needs to be. For example, only when an object is underneath a wire frame object. Touch transparency is decided not as a hard and fast rule. Rather, it depends entirely where is the recognized object and the location and type of the objects under it and where a user mouse-clicks within the perimeter of the wire frame object.

Regarding the presentation of text in a Blackspace environment, and its relationship to the Text Space function and the Staircase formatting object, the following information is pertinent. The basic structure of a text object is:

1) a document, which has a defined position and width, and keeps a list of paragraphs;
2) a paragraph, which manages the text between hard line breaks (i.e., when the user presses Enter or Return). It maintains a position and geometry relative to the document, data which determines how the text it contains should be laid out, and a list of lines;
3) a line, which is simply a horizontal row of alphanumeric characters and spaces. It has a position relative to the paragraph in which it resides, and data about which characters it should draw; and
4) formatting, which is the process which calculates the layout of text.

There are several factors that determine the position of a paragraph. By default it will be positioned directly below the previous paragraph, if there is one, horizontally at the left margin of the document, and with a wrap width that is the same as the document. The vertical position of a paragraph may be altered, either by hitting the Enter key or its equivalent to add spaces below or above a paragraph, or by using the Text Space function or, if it is formatted by a staircase formatting object, or by altering the staircase object. It has a top margin, which is alterable by Text Space, a vertical outline or list spacing, if a staircase formatting object has been applied, and its ultimate position relative to the paragraph above it is affected by all these factors. The Blackspace software is written to ensure that within a single text object it is not possible to make the text in a paragraph overlap the text in the paragraph above it, but it is possible to move a paragraph closer to the one above it using the Text Space function. If paragraphs threaten to overlap during a Text Space move, the top margin is altered, i.e., extended, so that the overlap is prevented. The staircase formatting object is fully described in copending U.S. patent application Ser. No. 10/635,704, filed Aug. 5, 2003 and incorporated herein by reference.

Similarly, the horizontal position may be altered, using the VDACC margin arrows to alter the left and right margins and, if it is controlled by a staircase formatting object, by changes in the staircase size and shape. The horizontal positioning is not limited like the vertical spacing; the user can alter it so that a paragraph moves to the left of a document if desired. The right margin is simply one value which determines the distance from the right side of the document where the paragraphs text wraps to the next line.

By default, a non-indented line has the same horizontal position as its paragraph, and its vertical position is directly below the line above it. The vertical spacing may be altered on a per-paragraph basis through font size selection in a window or Info Canvas object. The vertical and horizontal spacing of a line or paragraph or document may be altered by use of the Text Space function. The document stores this data, since the lines are generated dynamically by the formatting algorithm.

If a paragraph is a formatted list item, it has a header, although the header is not considered part of the paragraph's text. Thus in Text Space mode, to alter the horizontal spacing of the first line of a list item, the user moves the mouse over the first character after the list header, and the list header moves with the rest of the line. There is also a special case indent which may be applied in the staircase formatting object default spacing mode, in which the list header is drawn at the same horizontal position as the other lines, meaning that the recognized beginning of the line moves to the right. This indent is applied additionally to any changes to the horizontal spacing the user may make to that line.

Figure 8A:
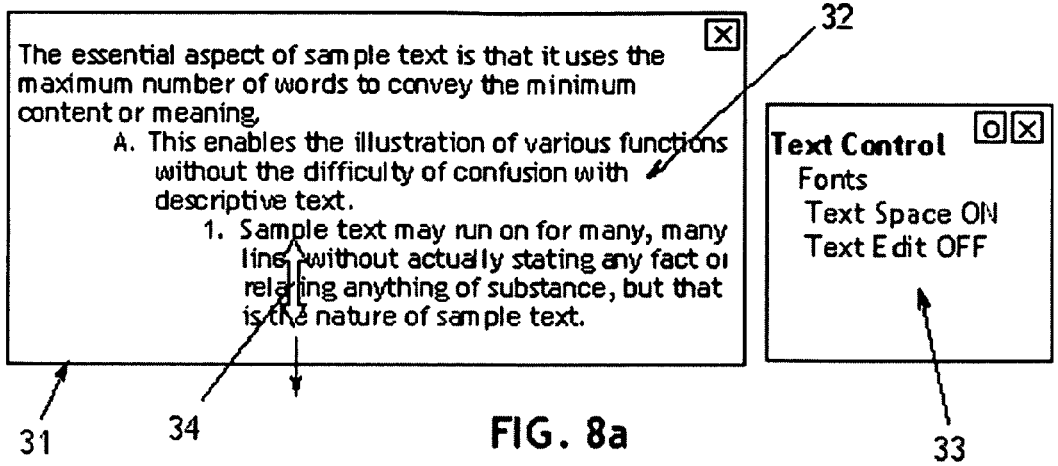
FIGS. 8a-8c depict various aspects of the Text Space mode of the present invention.
Figure 8B:
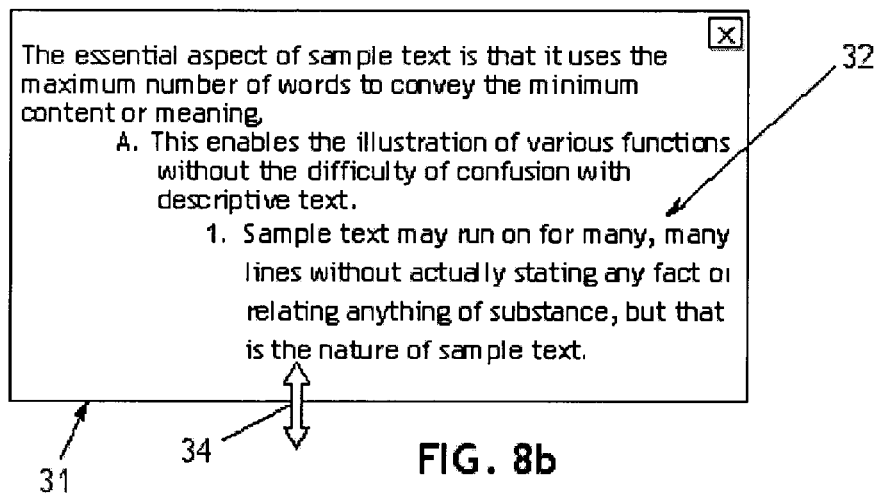
Figure 8C:
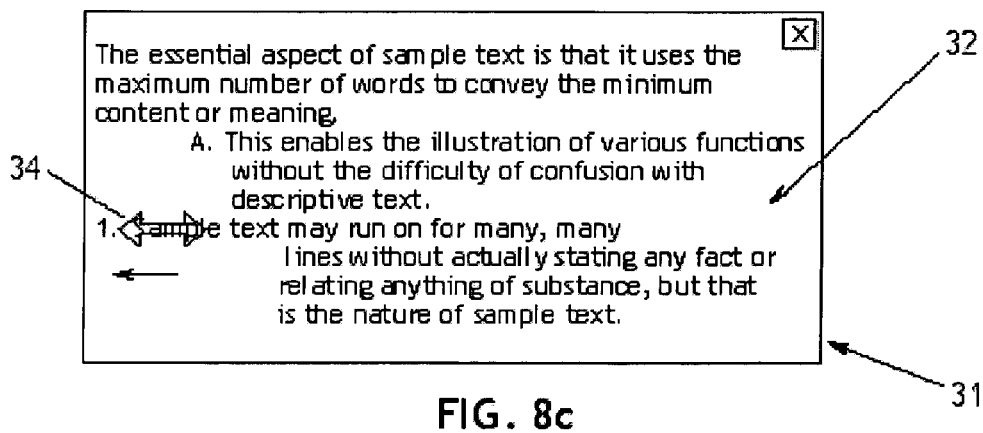

With reference to FIG. 8a, a VDACC object 31 may contain a text object 32 that is formatted in an outline or list style. By right clicking on the object 32, the user calls forth an Info Canvas object 33 that relates to text control. The user may click on Text Space ON to invoke this function, as explained above. Thereafter, floating the cursor over the text object 32 causes the cursor to change into a double ended arrow 34. In this condition the text content cannot be edited in any way, but the text spacing may be altered easily. For example, by clicking and dragging the arrow 34 downwardly as shown by the adjacent direction arrow, the underlying lines of text may be dragged downwardly to a new, wider spacing, as shown in FIG. 8b. In the same vein, the arrow 34 may be dragged laterally as shown in FIG. 8c to drag an individual line leftward (or rightward, at the user's discretion). Thus Text Space enables quick movement and custom spacing of text lines and paragraphs without regard to rigid rules of text line and formats as are known in the prior art. When Text Space is turned off, Text Edit is turned on to enable insertion, removal, correction, and other editing functions to be carried out within the object 32.

Figure 6:
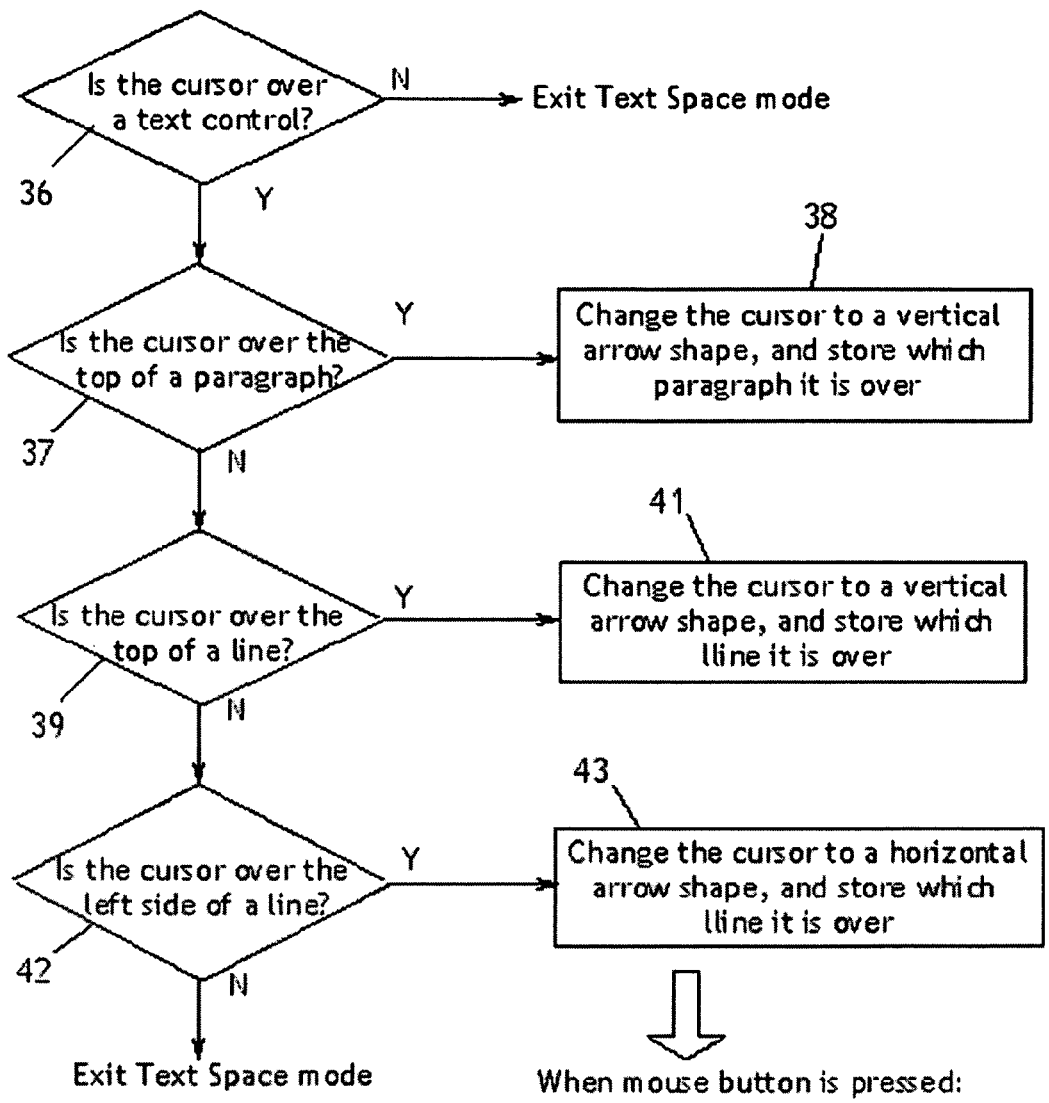
FIG. 6 is a flow chart depicting the operation of the Text Spacing function of the present invention as it relates to mouse cursor position.

The flow chart for correlating mouse movement during Text Space operations in shown in FIG. 6. The routine first determines at step 36 if the cursor is over a text control. If not, the routine exits the Text Space mode. If yes, it goes to step 37 and determines if the cursor is over the top of a paragraph. If so, it goes to step 38 changes the cursor to a vertical arrow shape and stores which paragraph the arrow overlies. If not, the routine goes to step 39 and determines if the cursor is floating over the top of a line. If yes, it goes to step 41 and changes the cursor to a vertical arrow and stores the identity of the line. If not, the routine goes to step 42 and determines that if the cursor is over the left side of a line it will change the cursor to a horizontal arrow (step 43) and store the identity of the line. Otherwise it will exit the Text Space mode. Thereafter if the routine remains in Text Space mode and its arrow is present, when the mouse button is pressed and moved a new text spacing is initiated.

Figure 7:
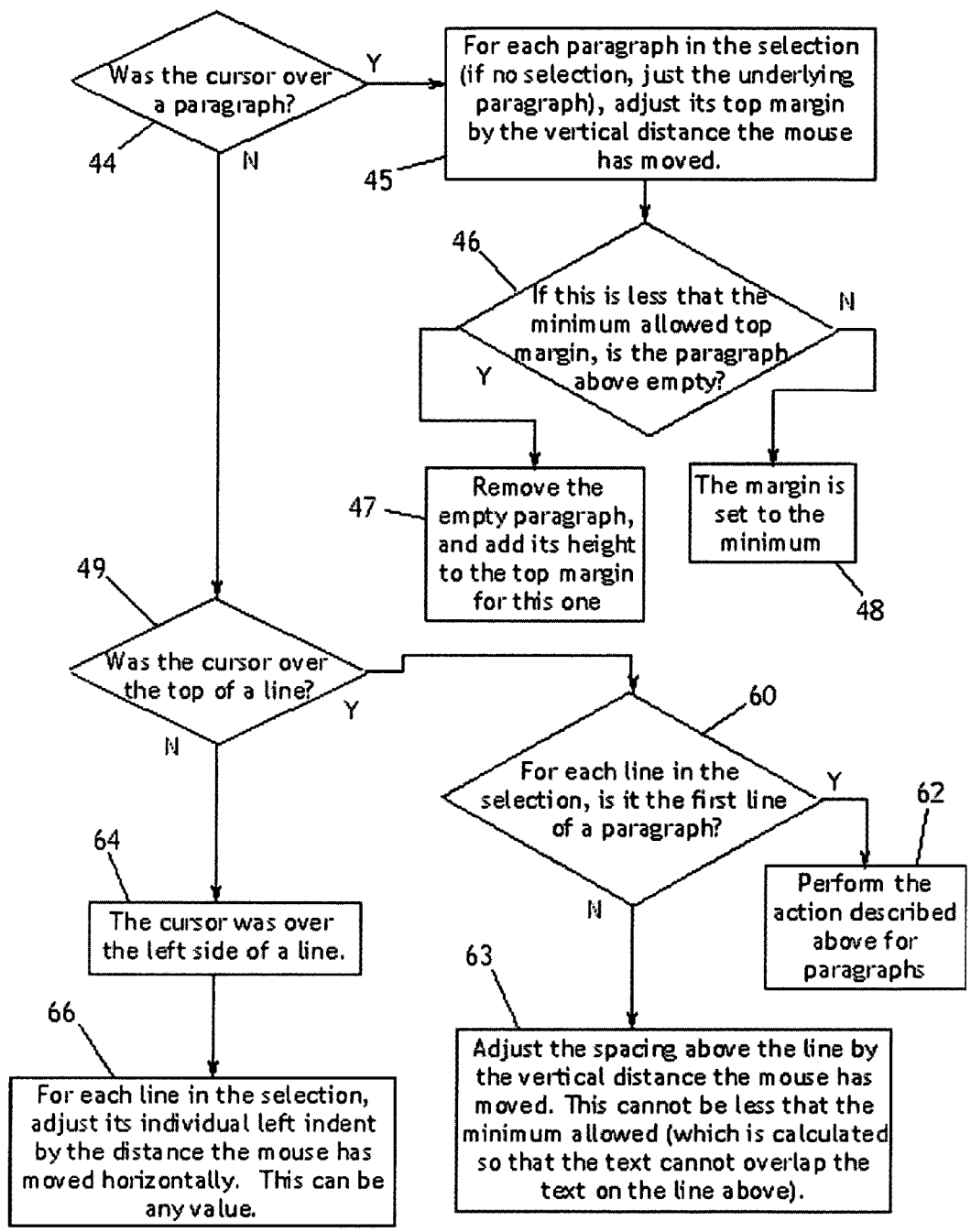
FIG. 7 is a flow chart depicting the operation of the Text Spacing function of the present invention as it relates to mouse cursor movement.

With reference to FIG. 7, if the cursor is over a paragraph when the mouse is moved in Text Space mode, for the underlying paragraph (or a selection of multiple paragraphs) adjust the top margin by the vertical distance the mouse is moved (step 45). In step 46, if the movement results in less that the minimum allowed top margin, and if the paragraph above is empty, then go to step 47 and remove the empty paragraph and add its height to the top margin for the moving paragraph. If not, go to step 48 and set the top margin to the minimum. Returning to step 44, if the cursor is not over a paragraph, but it is over the top of a line (step 49) go to step 60. For each line in the selection, if it is the first line of a paragraph, go to step 62 and perform the actions of steps 45-48. If it is not the first line of a paragraph, adjust the spacing above the line by the vertical distance the mouse has moved, within the minimum limit to prevent overlap with the line above (step 63). If the result at step 49 is no, then the cursor is over the left side of a line and, at step 66, for each line in the selection adjust its individual left indent by the distance the mouse has moved horizontally, which can be any value.

Figure 4:
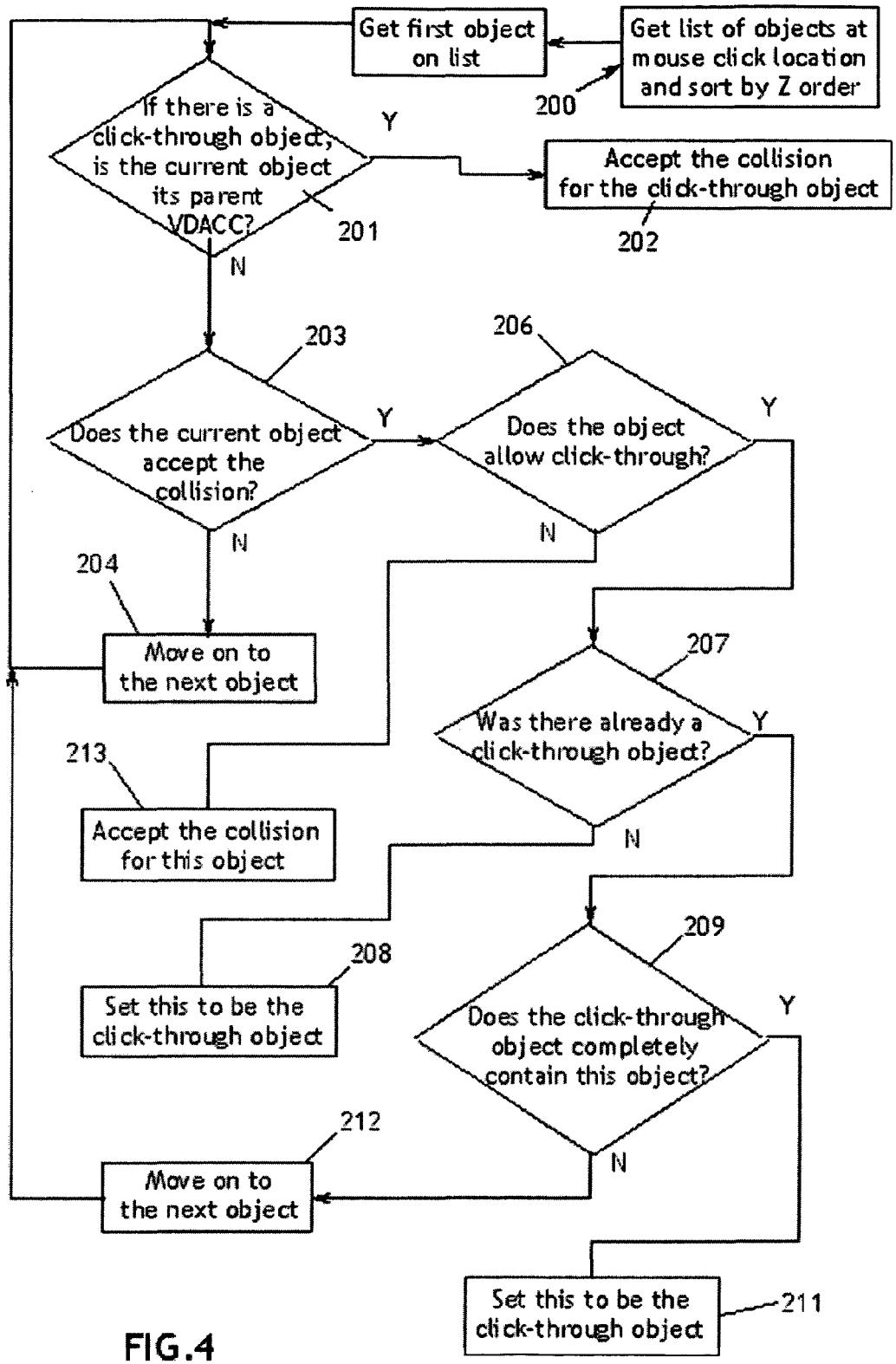
FIG. 4 is a flow chart depicting the operation of the Touch Transparency function of the present invention.

With regard to FIG. 4, the touch transparency of an onscreen object with regard to a mouse click or the like is determined as described in the flow chart. At step 200 the software, after receiving a mouse click at a screen location, gets a list of all objects that have an extent that coincides (collides) with the click location, sorts the list by Z order (topmost to bottommost of the overlying objects at the location) and then gets the first object on the list. That is, the routine goes through the list in order, and each object has a test by which it can accept or reject the collision. An object that accepts the collision is designated to respond to the mouse click, whereas an object that does not accept the collision or which passes through the click does not respond to the mouse click. At step 201, the routine determines if the current object is a click-through object in a parent VDACC object. If so, it accepts the collision for the click-through object at step 202. If not, it goes to step 203 and determines if the current object accepts the collision. If not, it goes to step 204 and moves on to the next object in the list. If the result at step 203 is yes, it goes to step 206 and determines if the object allows click-through. If not, it accepts the collision for the current object at step 213. If the object allows click through at step 206, it then determines at step 207 if there is not already a click-through object and at 2 the current object to be the click-through object. If a click-through object already exists, it determines at step 209 if the previous click-through object completely contains the current object and if yes it sets the current object to be the click-through object. If no at 209, the routine moves on to the next object on the list. Thus the routine goes through the list until it finds an object at the click location that is capable of receiving and responding to the click. If the end of the list is reached and there is a click-through object and no other object has been found to accept the click, the click-through object receives the click. Otherwise it is determined that the click has occurred in empty Blackspace drawing surface.

Figure 5:
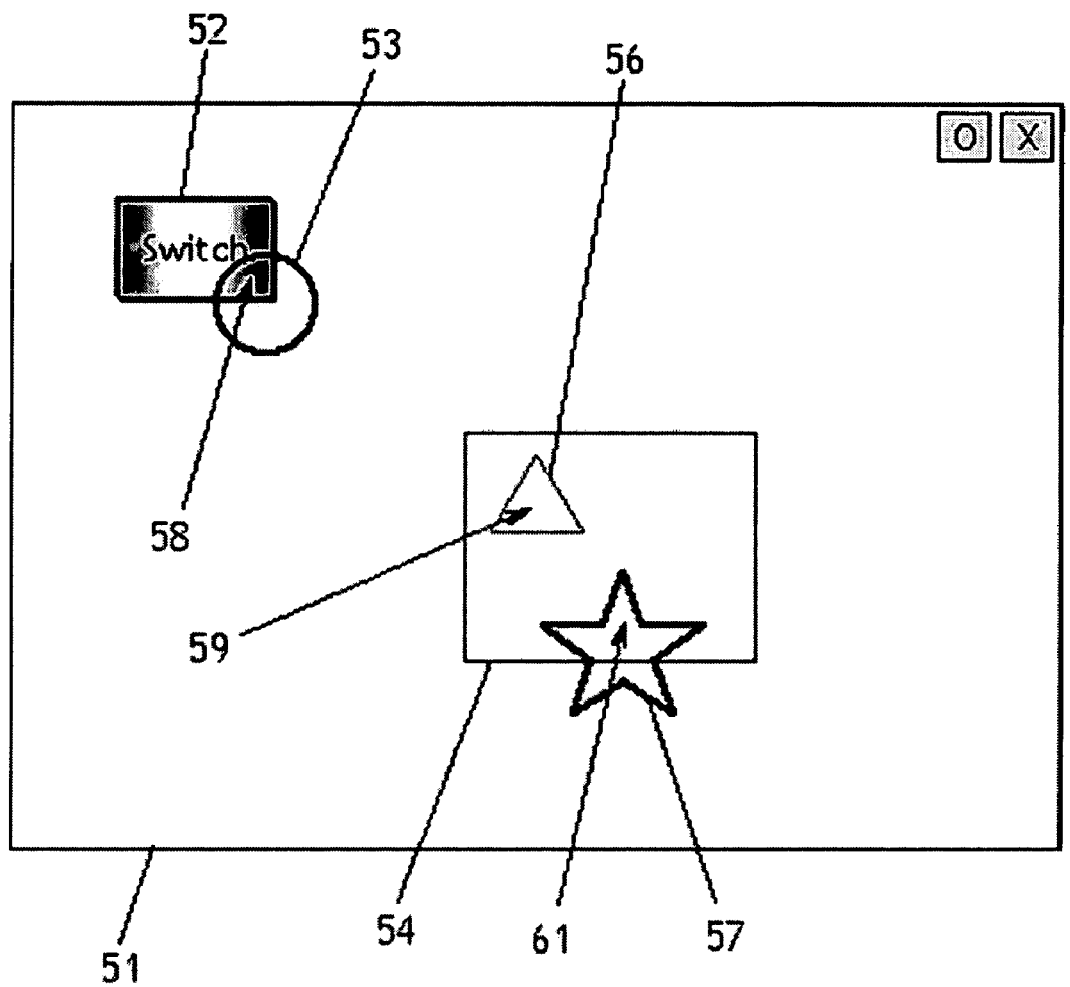
FIG. 5 is a layout depicting graphic objects on a display screen and the use of the Touch Transparency function of the present invention.

FIG. 5 provides a display layout to illustrate the operation of the routine of FIG. 4. A VDACC object 51 contains a switch 52 and a circle 53 overlying the switch. A rectangle 54 is also displayed not intersecting objects 52 or 53. Triangle 56 is disposed within the rectangle 54, and star 57 is partially within the rectangle 54. If a click is received at 58 within the circle 53 and over the switch 54, the top object is the circle. It accepts the mouse click but allows click-through, since the user has clicked in the transparent area of the circle. The routing then analyzes the underlying switch, which also accepts the mouse click but does not allow click-through. Thus the switch 52 receives the mouse click.

For a mouse click at 59, the uppermost object is the rectangle 54. It accepts a mouse click and allows click-through, since it was clicked where it is transparent. The triangle 56 is then analyzed: it accepts the click, and also allows click-through, since it is transparent, so it becomes the click-through object (step 211). The next object below on the processing list is the VDACC object 51. Because it is the parent VDACC object of the current click-through object (the triangle 56), the decision at step 201 is yes and at step 202 the collision is accepted for the current click-through object, which is the triangle 56.

For a mouse click at 61, the uppermost object is once again the rectangle 54. It accepts the mouse click and allows click-through. Next on the list is the star 57. It accepts the mouse click and allows click-through. However, a click-through object has already been identified (56), and it does not fully contain the star 57 (step 209), so the rectangle 54 remains the click-through object. The next object below on the processing list is the VDACC object 51. Because it is the parent VDACC object of the current click-through object (the rectangle 54), the decision at step 201 is Yes and at step 202 the collision is accepted for the current click-through object, which is the rectangle 54.

With reference to FIGS. 9, 10A, 10B and 11, a method for editing an electronic document containing text and one or more graphic objects in a VDACC object in accordance with an embodiment of the invention is described. The method allows a user to easily edit and manipulate the textual and graphic contents of an electronic document to modify the layout of the electronic document to a desired configuration. The method is particularly useful when a user wants to add or delete text in an electronic document, but do not want graphic objects near the top or the bottom of pages to "jump" to the adjacent pages. Thus, the method virtually eliminates the need to use "trial and error" approach to position the graphic objects relative to text and/or page.

Figure 9:
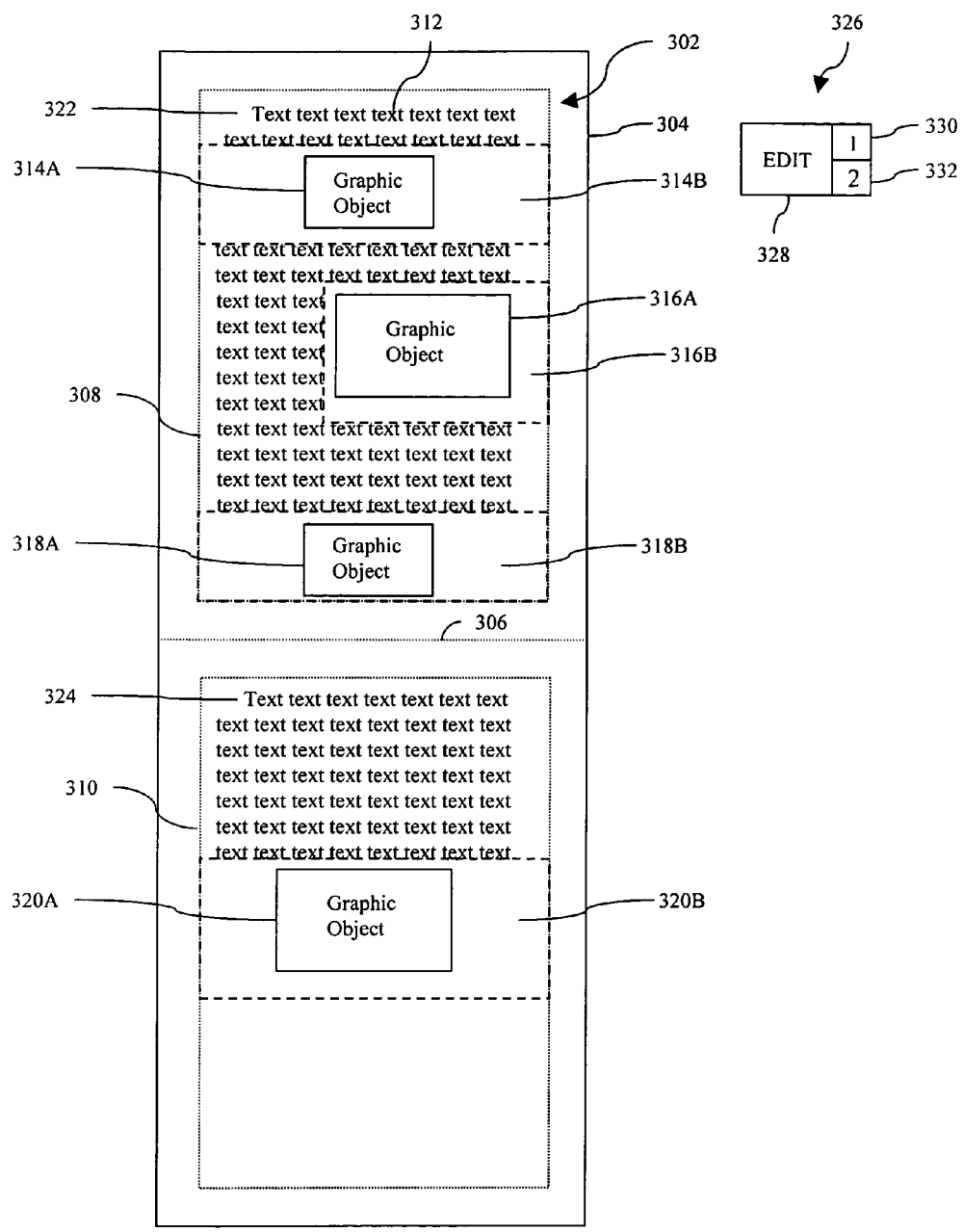
FIG. 9 shows an electronic document of text and graphic objects in a VDACC object in accordance with an embodiment of the invention. The term "VDACC" is a trademark of NBOR Corporation.

In FIG. 9, an electronic document 302 in a VDACC object 304 is shown. The VDACC object 304 is shown to be large enough to display two pages of the electronic document 302 so that the editing method can be easily described. However, the VDACC object 304 can be smaller or larger than shown in FIG. 9. The two pages of the electronic document 302 are defined by the boundary of the VDACC object 304 and a page break 306 between the two pages. The two displayed pages of the electronic document 302 include margins that are indicated by rectangular dotted lines 308 and 310. The electronic document 302 contains text 312 and graphic objects 314A, 316A, 318A and 320A, which are shown to be positioned within the main body of the pages (the pages excluding margins). The text 312 of the electronic document 302 includes paragraphs 322 and 324. The text 312 can comprise a single text object or multiple text objects, such as the text objects shown in FIG. 1. If the text 312 includes more than one text object, the Rippling routine will apply to the different text object, as described above. The graphic object 314A is vertically positioned within the paragraph 322 in a space 314B between the second and third text lines. The graphic object 316A is positioned in the paragraph 322 in a space 316B between the fifth and tenth text lines and to the left of sixth thru ninth text lines. The graphic object 318A is vertically positioned in a space 318B between the paragraphs 322 and 324. The space 318B between the paragraphs 322 and 324 is located below the paragraph 322, but above the page break 306. The graphic object 320A is vertically positioned in a space 320B below the paragraph 324, and thus, is positioned below the entire text 312 contained in the electronic document 302.

FIG. 9 also shows an EDIT switch 326 that is used during the editing method. The EDIT switch 326 includes a primary switch 328 and two secondary switches 330 and 332. The primary switch 325 is identified by the "EDIT" label, while the secondary switches 330 and 332 are identified by the "1" and "2" labels, respectively. When the primary switch 3 activated, a duplicate VDACC object is created. The two VDACC objects are linked so that when one of the two VDACC objects are scrolled, the other VDACC objects scrolls to the same position. Furthermore, the graphic objects contained in the electronic document 302, which satisfy one of predefined criteria, are extracted from the original VDACC object 304 and placed in the duplicate VDACC object at positions that correspond to the respective positions in the original VDACC object. As an example, the predefined criteria include (1) whether the graphic object is below the entire text of an electronic document, e.g., the graphic object 320A, (2) whether the graphic object is over empty paragraphs, i.e., where the user has hit the "ENTER" key several times, (3) whether the graphic object is positioned in a space in the text created with the Text Space tool, either between two paragraphs, e.g., the graphic object 318A, or between lines in a paragraph, e.g., the graphic object 314A, and (4) whether the graphic object is positioned to the left or right of text in a paragraph or paragraphs that have had their left or right margins altered, e.g., the graphic object 316A.

Figure 10A:
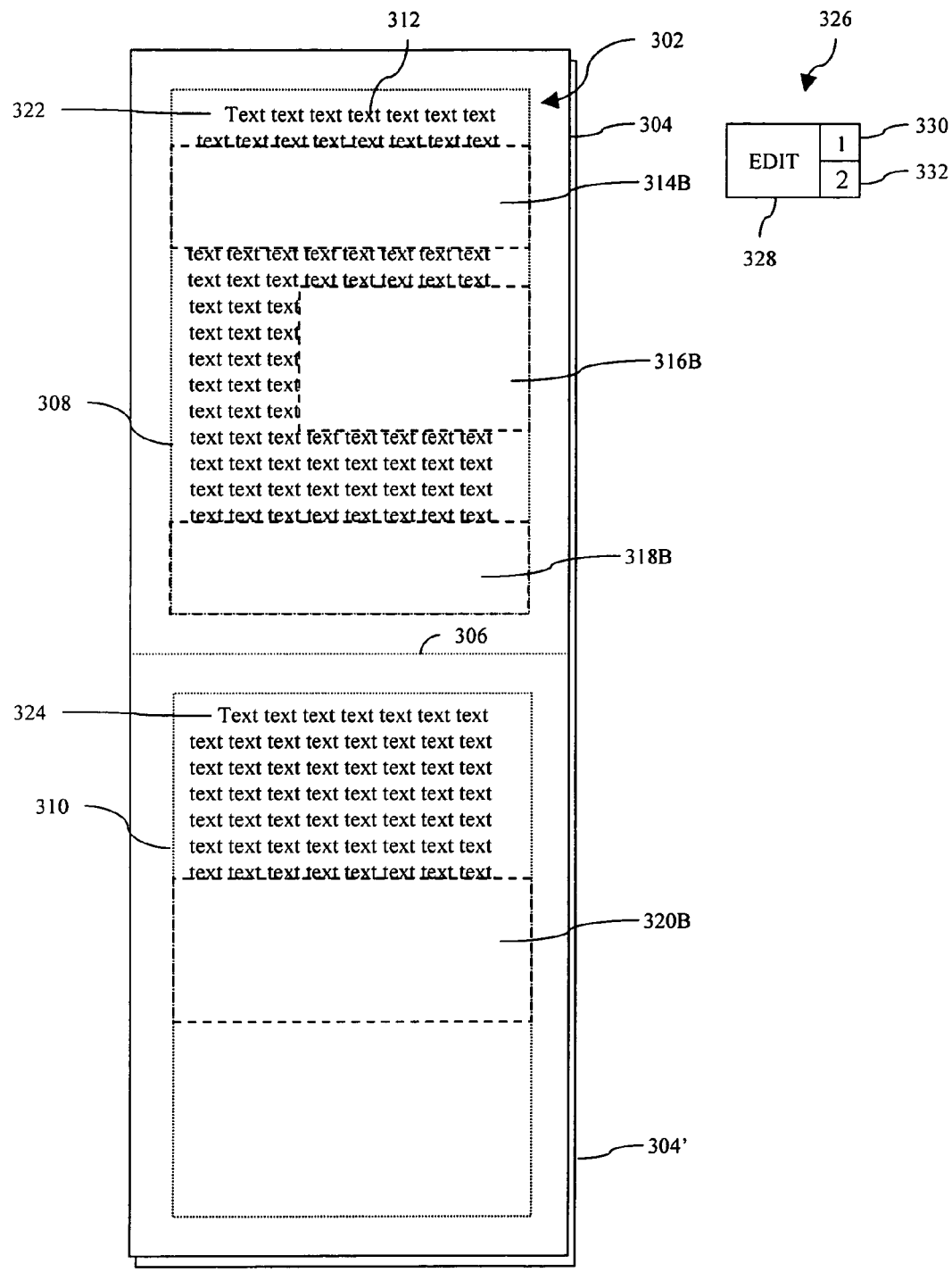
FIG. 10A shows a duplicate VDACC object, which is positioned precisely below the original VDACC object, in which the graphic objects are placed when a primary switch for editing is activated in accordance with an embodiment of the invention.

In one embodiment, as illustrated in FIG. 10A, the duplicate VDACC object 304' is positioned precisely below the original VDACC object 304 (slightly offset in FIG. 10A to show the duplicate VDACC object 304'). Note that, in FIG. 10A, the graphic objects 314A, 316A, 318A are no longer displayed in the original VDACC object 304, since these graphic objects have been extracted from the original VDACC object 304 and have been placed in the duplicate VDACC object 304'. However, using the "1" and "2" secondary switches 330 and 332 of the EDIT switch 326, a user can toggle between the two VDACC objects 304 and 304' by pressing the secondary switches. If only the original VDACC object 304 is visible, as is the case in FIG. 10A, the duplicate VDACC object 304' can be made visible by pressing the secondary switch that corresponds to the duplicate VDACC object, and vice versa. As an example, the "1" secondary switch 330 of the EDIT switch 326 may correspond to the original VDACC object 304 and the "2" secondary switch 332 of the EDIT switch 326 may correspond to the duplicate VDACC object 304'. The duplicate VDACC object 304' can be made visible by moving only the original VDACC object 304 or the duplicate VDACC object away from the other VDACC object so that the two VDACC objects are both visible.

Figure 10B:
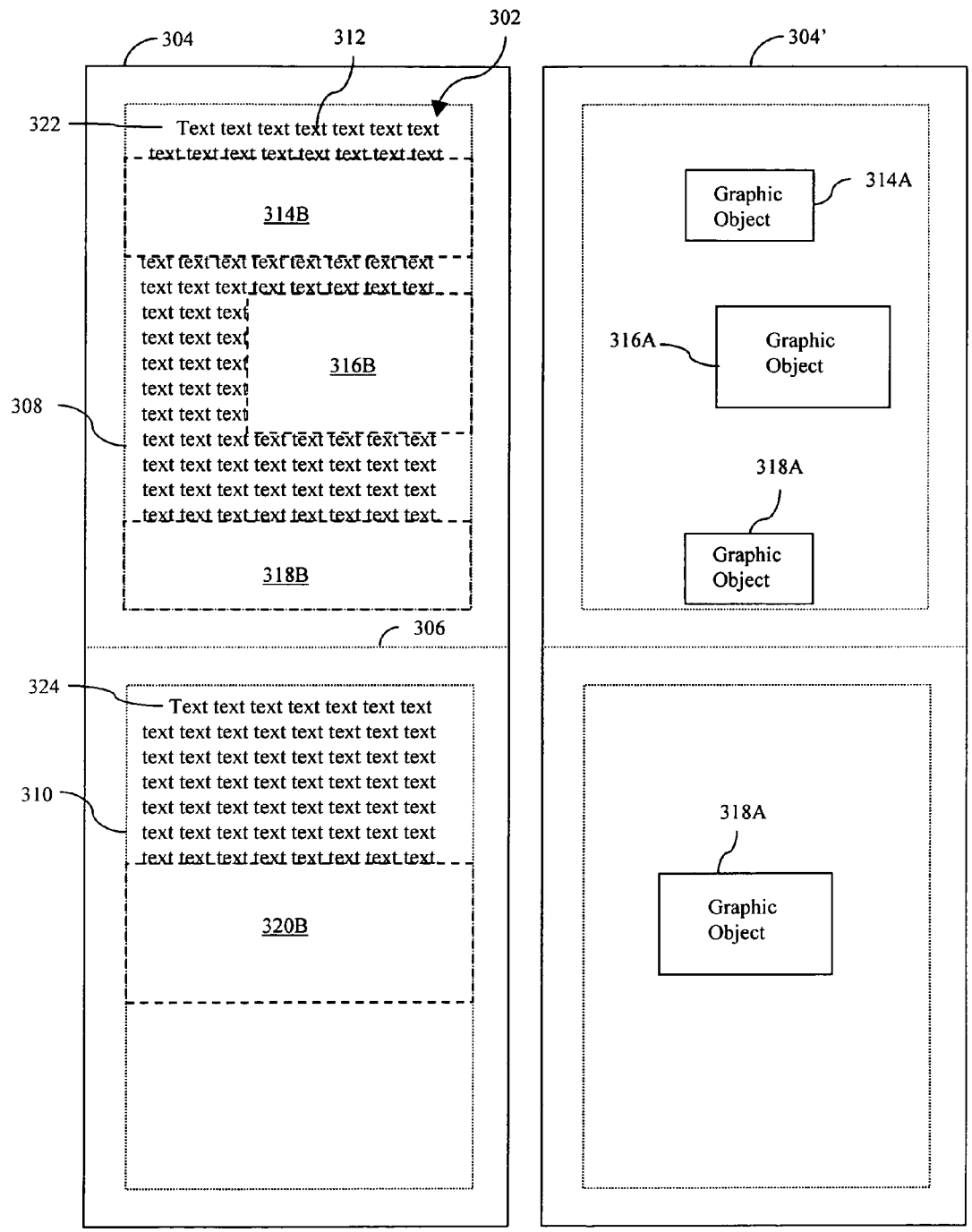
FIG. 10B shows a duplicate VDACC object, which is positioned next to the original VDACC object, in which the graphic objects are placed when the primary switch for editing is activated in accordance with another embodiment of the invention.

In another embodiment, when the primary switch 328 of the EDIT switch 326 is activated, the duplicate VDACC object 304' is displayed next to the original VDACC object 304 so that the two VDACC objects are both displayed, e.g., side by side, as illustrated in FIG. 10B. In this embodiment, the secondary switches 330 and 332 of the EDIT switch 326 are not necessary since both VDACC objects 304 and 304' are visible. In an alternative embodiment, when the primary switch 328 of the EDIT switch 326 is activated, the duplicate VDACC object 304' may be displayed below the original VDACC object 304 but slight offset so that the two VDACC objects are both visible.

After the duplicate VDACC object 304' has been created, the layout of the electronic document 302 in the original VDACC object 304 can be modified by, for example, inserting additional text, deleting some of the text 312, increasing line spaces in the text, decreasing line spaces in the text, changing left or right margins of text in one or more paragraphs, and/or moving portions of the text. When the main switch 328 of the EDIT switch 326 is again activated, the graphic objects 314A, 316A, 318A and 320A that were placed in the duplicate VDACC object 304' are placed back into the original spaces in the electronic document 302 in the original VDACC object 304. The duplicate VDACC object 304' is then deleted. However, if a graphic object does not fit back in the original space in the electronic document 302, then that graphic object is left behind in the duplicate VDACC object 304'.

A graphic object will not fit in the original space in the electronic document 302 if the original space was reduced such that the height or width of that space is shorter than the corresponding height or width of the graphic object as a result of the textual modification of the electronic document. Margins of pages in the electronic document 302 are not considered to be part of spaces in the electronic documents for the purpose of the editing method. Thus, in determining the dimensions of spaces in the electronic document 302, the left and right margins of the pages in electronic document are used as lateral boundaries. However, the top and bottom margins of the pages in the electronic document 302 (except maybe the topmost margin in the electronic document) are not used as vertical boundaries for determining dimensions of spaces in the same manner as the left and right margins. This is because a space can be vertically positioned between adjacent pages across top and bottom margins. In such situations, a graphic object will be considered to not fit in the original space in the electronic document 302 if the graphic object does not fit completely in one of the two portions of the original space, which are divided by a page break.

Figure 11:
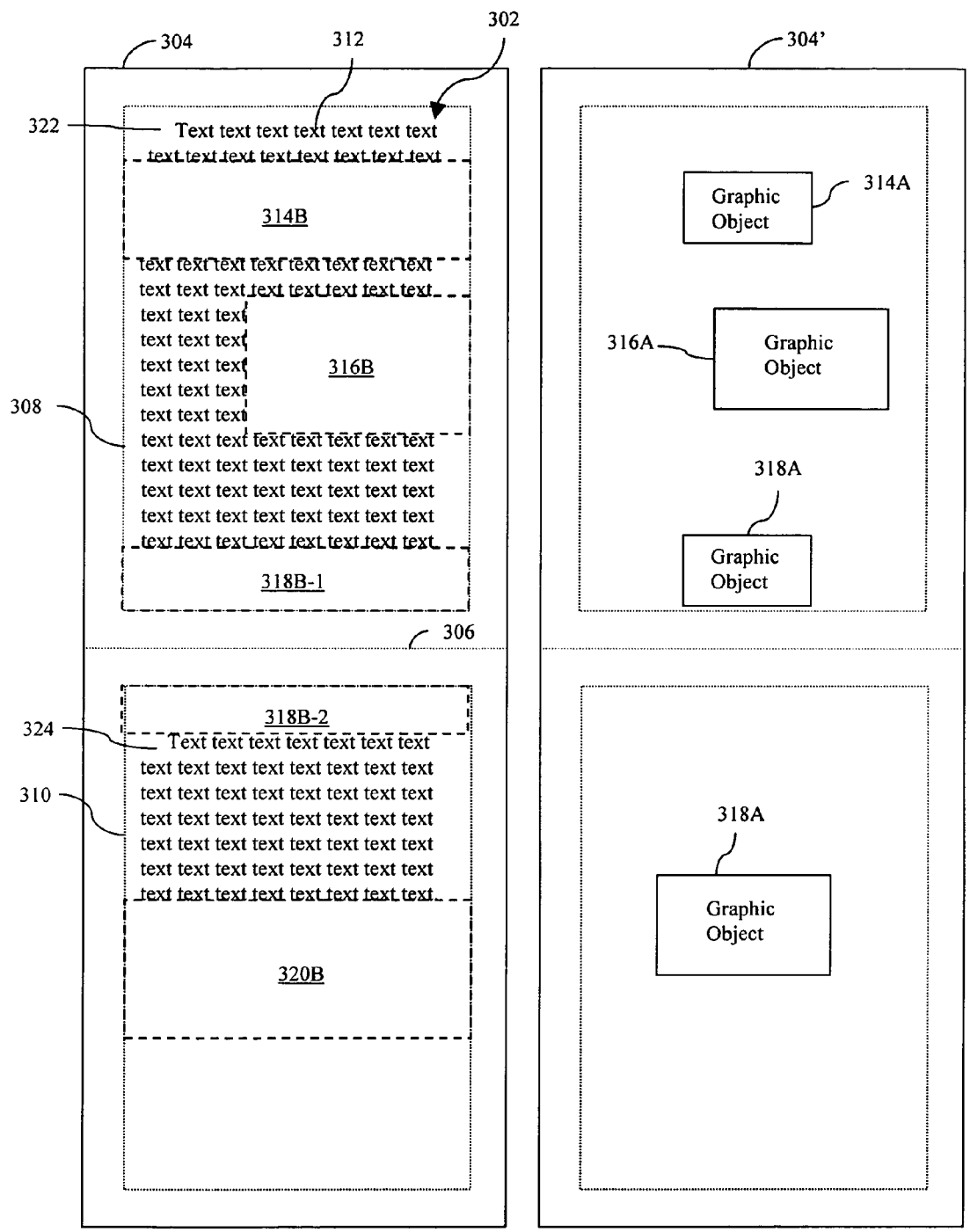
FIG. 11 illustrates text being modified in the original VDACC object that will prevent one of the graphic objects from being placed back in the original VDACC object when the primary switch for editing is deactivated in accordance with an embodiment of the invention.

As an example, if the user inserts new text above the space 318B in the electronic document 302 in FIG. 10B, the space 318B will be displaced downward across the page break 306, as well as the paragraph 324, the graphic object 320A and the space 320B, as illustrated in FIG. 11. The amount of downward displacement of the space 318B will depend on the number of new text lines added to the paragraph 22. As shown in FIG. 11, the space 318B is now divided into two portions 318B-1 and 318B-2 by the page break such that the top portion 318B-1 of the space is in the first page of the electronic document 302 and the bottom portion 318B-2 of the space is in the second page of the electronic document. It is assumed here that the height of the graphic object 318A is greater than the height of the portion 318B-1 and the height of the portion 318B-2. The height of the portion 318B-1 is defined by the distance between the page break 306 minus the bottom margin of the page and the bottom of text in the paragraph 322. Similarly, the height of the portion 318B-2 is defined by the distance between the page break 306 plus the page top margin and the top of text in the paragraph 324. Although the height of the top margin and the height of the bottom page margin of pages appear in FIG. 11 to be equivalent, the height of the bottom margin may be different than the height of the top margin for each page of the electronic document 302. Note: the vertical height of the margins is editable by a user, as in any word processing environment common in the art.

If the user now presses the primary switch 328 of the EDIT switch 326, the graphic object 318A will be left behind in the duplicate VDACC object 304' since the graphic object 318A will not fit in either one of the portions 318B-1 and 318B-2 of the space 318B.

When a graphic object is left behind in the duplicate VDACC object 304', a user generally has two choices to insert the graphic object back into the original VDACC object 304. The first choice is to adjust the layout of the textual contents in the electronic document 302 to increase the associated space large enough to fit the graphic object. As an example, text in one or more paragraphs of the electronic document 302 can be removed without deleting the line spaces that the removed text had occupied. As another example, the space can be increased by adding new text lines in the space, e.g., by repeatedly pressing the Enter key. As another example, the margin of text in one or more paragraphs of the electronic document can be reduced to increase the height of the space, e.g., the space 316B. The second choice is to change the size of the graphic object so that the graphic object will fit into the current space in the electronic document 302.

The choices are different when a graphic object does not fit into the corresponding space because the space was divided by a page break where there may or may not exist bottom and top margins, respectively, above and below this break. In this situation, there are three choices to insert the graphic object back into the original VDACC object. The first choice is to adjust the layout of the textual content to increase the divided portion of the space in one of the two pages in which the user wants to insert the graphic object. The second choice is to change the size of the graphic object so that the graphic object will fit into the divided portion of the space in the page in which the user wants to insert the graphic object, e.g., making the graphic object 31 8A fit into the space 318-1 or 318-2. The third choice is to activate a feature that will split the graphic object so that part of the graphic object will fit in one of the divided portions of the space and the remaining part of the graphic object will fit in the other divided portion of the space.

NOTE: Any space in a piece of text can move down or up to any position and the graphics that belong to that space still know which space they belong to. So, when the Edit switch is turned back off, these graphics will be properly placed back into their correct space and in the correct orientation, namely, the correct position in this space.

It doesn't matter if a space moves to a following page; the graphics belonging to this space are still properly placed back into the space. With regards to the vertical spacing, the software records each object's position in a text object relative to a particular paragraph in that text object. One way to do this is to measure the distance from the top of the paragraph, which is directly above the object that exists in the space directly below this paragraph, to the top of the object. The software could also measure the distance from the bottom of the paragraph to the top, bottom or middle of the objects in the space directly below it.

Regarding the horizontal spacing of objects in spaces in text objects, one approach would be for the software to measure from the left-hand side of the VDACC object to the left edge of the objects. Another approach would be to either (1) measure from the left-hand side of the VDACC object to the center or right side of the objects, (2) measure from the right side of the VDACC object to the right, center or left edge of the objects, or (3) measure from the top and/or bottom edge of the VDACC object to the center of the objects, etc.

After one of the above-described choices is performed for each graphic object left behind in the duplicate VDACC object 304', the primary switch 328 of the EDIT switch 326 can again be activated to place the remaining graphic objects that were previously left behind back into the original VDACC object 304. Again, if a graphic object in the duplicate VDACC object 304' will not fit in the corresponding space in the original VDACC 304, that graphic object will again be left behind in the duplicate VDACC object, which allows the user to try to correct the situation.

The editing method in accordance with the invention provides a user more control with respect to the layout of an electronic document containing text and graphic objects. In particular, the method allows a user to more efficiently position graphic objects at desired locations in an electronic document. An advantage of the editing method over conventional methods is that graphic objects do not automatically "jump" to the next page when new texts are added to an electronic document. Thus, a user can selectively edit a page of an electronic document without destroying the layout of all remaining pages of the electronic document. The invention preserves all spaces in text so that the user can easily see these spaces without their accompanying graphics. This way text only can be edited without the burden of accounting for the vertical positions graphics in the text, as the graphics, pictures, drawings, etc., have been temporarily removed to a duplicate VDACC object linked to the original VDACC object. Spaces break apart line by line across page breaks and across top and bottom margins without altering the overall vertical spacing of the document. So the user is never at risk of destroying the vertical spacing of their document by a picture, graphic, text box and the like that jumps to a next page and thereby alter the vertical spacing of the following pages in the document. When spaces only hit a page break (with or without margins), the spaces automatically break apart as each new line of text above them is added by typing or insertion. Therefore, the user is free to add or subtract any one or more lines of text from the document and overall vertical spacing of the document is perfectly preserved.

Figure 12:
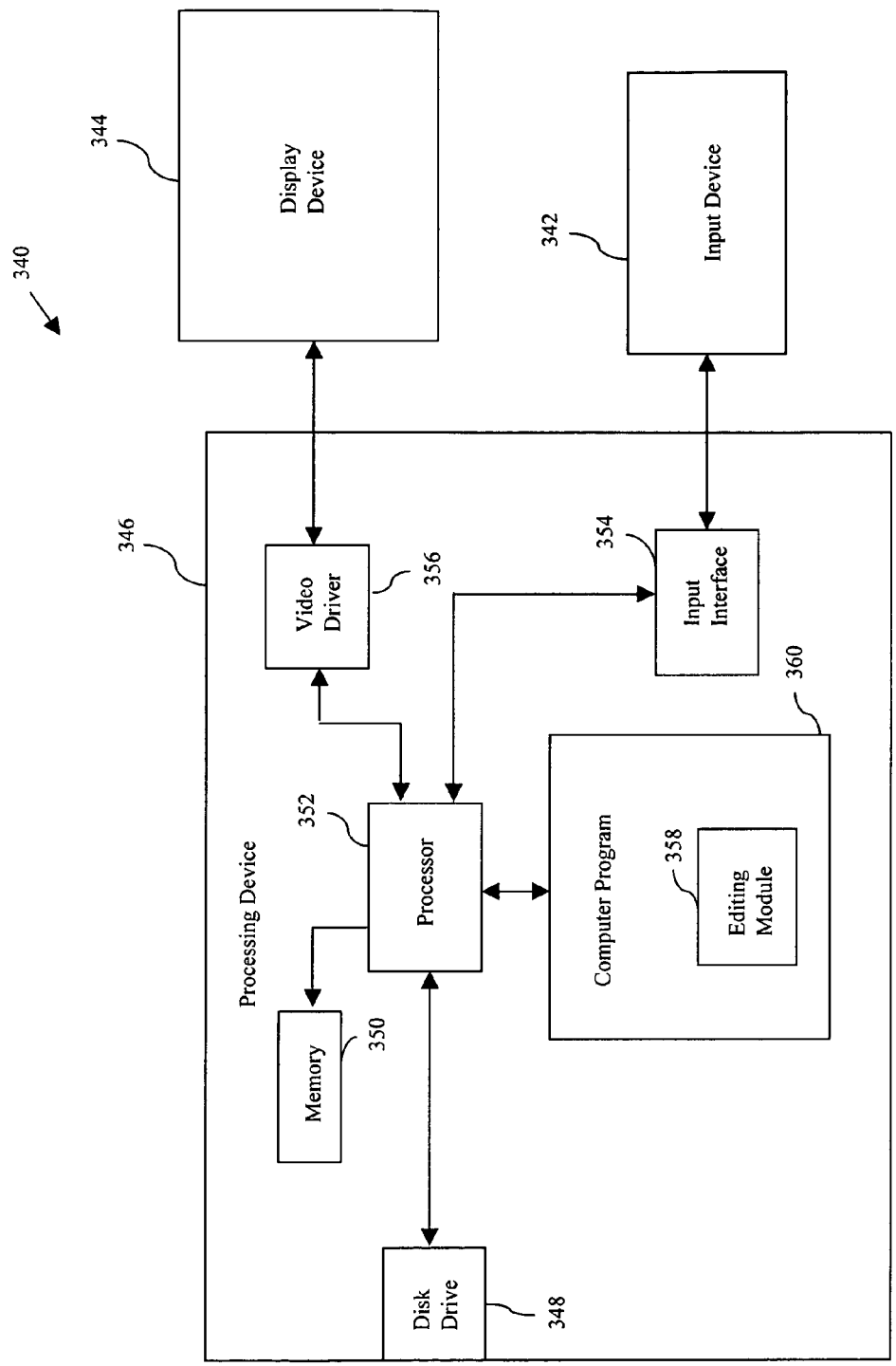
FIG. 12 is a block diagram of a system for editing an electronic document of text and graphic objects in a VDACC object in accordance with an embodiment of the invention.

Turning now to FIG. 12, a computer system 340 for editing an electronic document containing text and one or more graphic objects in a VDACC object in accordance with an embodiment of the invention is shown. The computer system 340 may be a personal computer, a personal digital assistant (PDA) or any computing system with a display device. As shown in FIG. 12, the computer system 340 includes an input device 342, a display device 344 and a processing device 346. Although these devices are shown as separate devices, two or more of these devices may be integrated together. The input device 342 allows a user to input commands into the system 340 and to enter text and graphic objects to be displayed in the display device 344. The input device 342 may include a computer keyboard and a mouse. However, the input device 342 may be any type of electronic input device, such as buttons, dials, levers and/or switches on the processing device 346. Alternative, the input device 342 may be part of the display device 344 as a touch-sensitive display that allows a user to input commands using a stylus. The display device 344 may be any type of a display device, such as those commonly found in personal computer systems, e.g., CRT monitors or LCD monitors.

The processing device 346 of the computer system 340 includes a disk drive 348, memory 350, a processor 352, an input interface 354 and a video driver 356. The processing device 346 further includes an editing module 358, which performs operations related to editing an electronic document containing text and one or more graphic objects in a VDACC object. As shown in FIG. 12, the editing module 358 may be implemented as part of a computer program 360, e.g., a Blackspace program that provides a Blackspace operating environment. In one embodiment, the editing module 358 is implemented as software. However, the editing module 358 may be implemented in any combination of hardware, firmware and/or software.

The disk drive 348, the memory 350, the processor 352, the input interface 354 and the video driver 356 are components that are commonly found in personal computers. The disk drive 348 provides a means to input data and to install programs into the system 340 from an external computer readable storage medium. As an example, the disk drive 348 may a CD drive to read data contained therein. The memory 350 is a storage medium to store various data utilized by the computer system 340. The memory 350 may be a hard disk drive, read-only memory (ROM) or other forms of memory. The processor 352 may be any type of digital signal processor that can run the computer program 360, including the editing module 358. The input interface 354 provides an interface between the processing device 346 and the input device 342. The video driver 356 drives the display device 344. In order to simplify the figure, additional components that are commonly found in a processing device of a personal computer system are not shown or described.

Figure 13:
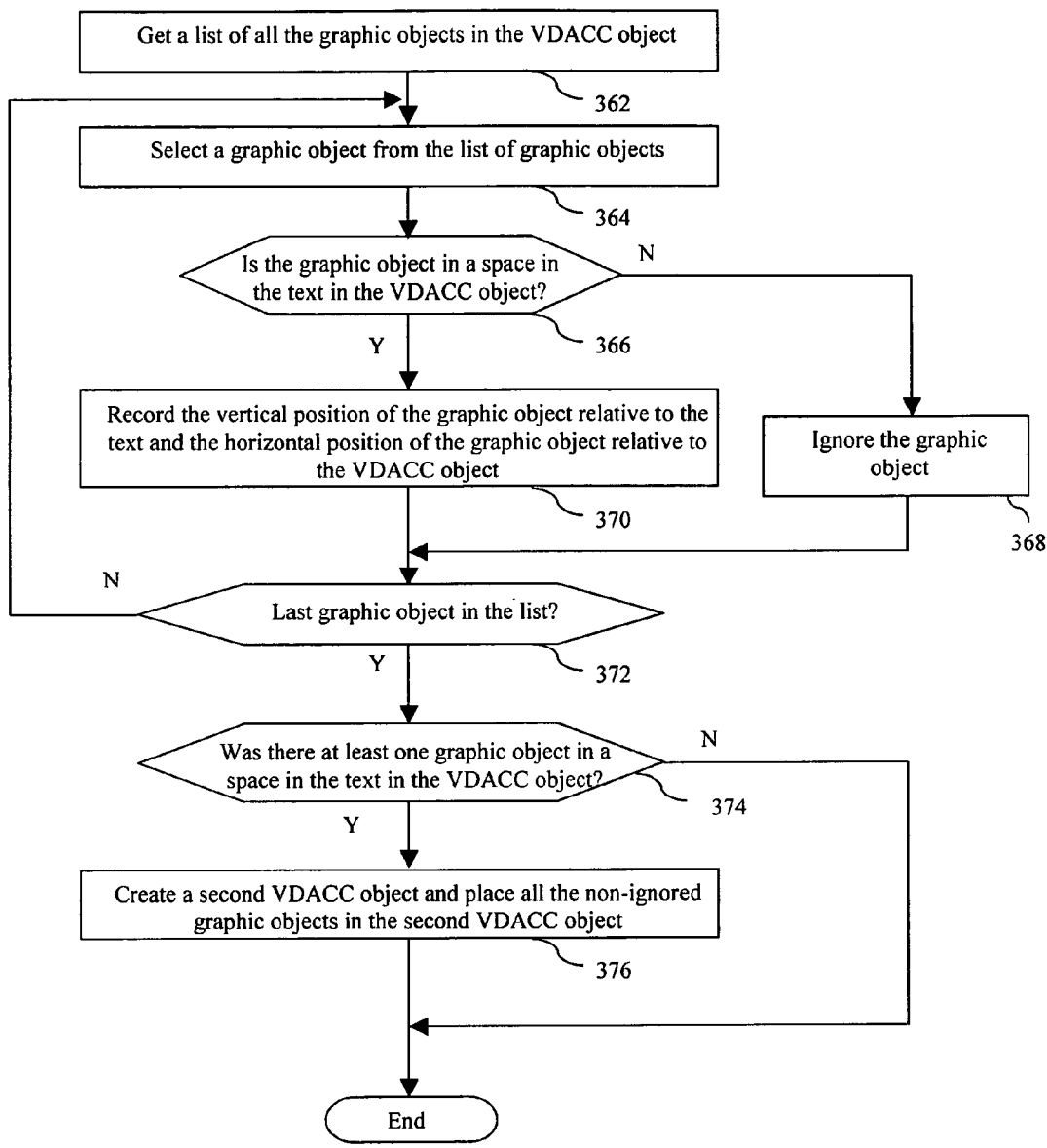
FIG. 13 is a flowchart of a process to extract graphic objects out of a VDACC object in accordance with an embodiment of the invention.

FIG. 13 shows a flowchart of a process performed by the editing module 358 to extract graphic objects out of a VDACC object in accordance with an embodiment of the invention. This process begins when a user hits the primary switch of the EDIT switch. At block 362, a list of all the graphic objects in the VDACC object is acquired. Next, at block 364, a graphic object from the list of graphic objects is selected. Next, at block 366, a determination is made whether the selected graphic object is in a space in the text in the VDACC object. An object is in a space in the text in the VDACC object if: (a) it is below the text; (b) it is over empty paragraphs, i.e., where the user has hit Enter key several times; (c) it is in a space created with the Text Space tool, either in between two paragraphs or between lines in a paragraph; or (d) it is to the left or right of text in a paragraph of paragraphs which have had their left or right margins altered.

If no, then the graphic object is ignored, at block 368, and the process proceeds to block 372. If yes, then the vertical position of the graphic object relative to the text and the horizontal position of the graphic object relative to the VDACC object are recorded, at block 370. In most cases, this is done by determining which paragraph the top of the object is directly below, creating a marker identifying that paragraph, and recording the distance between the top of the paragraph and the top of the object. Other calculation possibilities exist as described above. Next, at block 372, a determination is made whether the graphic object is the last graphic object in the list. If no, then the process proceeds back to block 364 to select the next graphic object. If yes, the process proceeds to block 374, where a determination is made whether there was at least one graphic object in a space in the text in the VDACC object. If no, the process comes to an end and nothing is done. If yes, a duplicate VDACC object is created and all the non-ignored graphic objects are placed in the duplicate VDACC object, at block 376. The process then comes to an end. This method enables the software to keep track of each object in the second VDACC object and the position of the space in the first VDACC object that each object was originally located within. If this space moves up or down, even to another page, the software can track its new position and ensure that its original graphic(s) are returned to their correct space and in their correct orientation.

Figure 14:
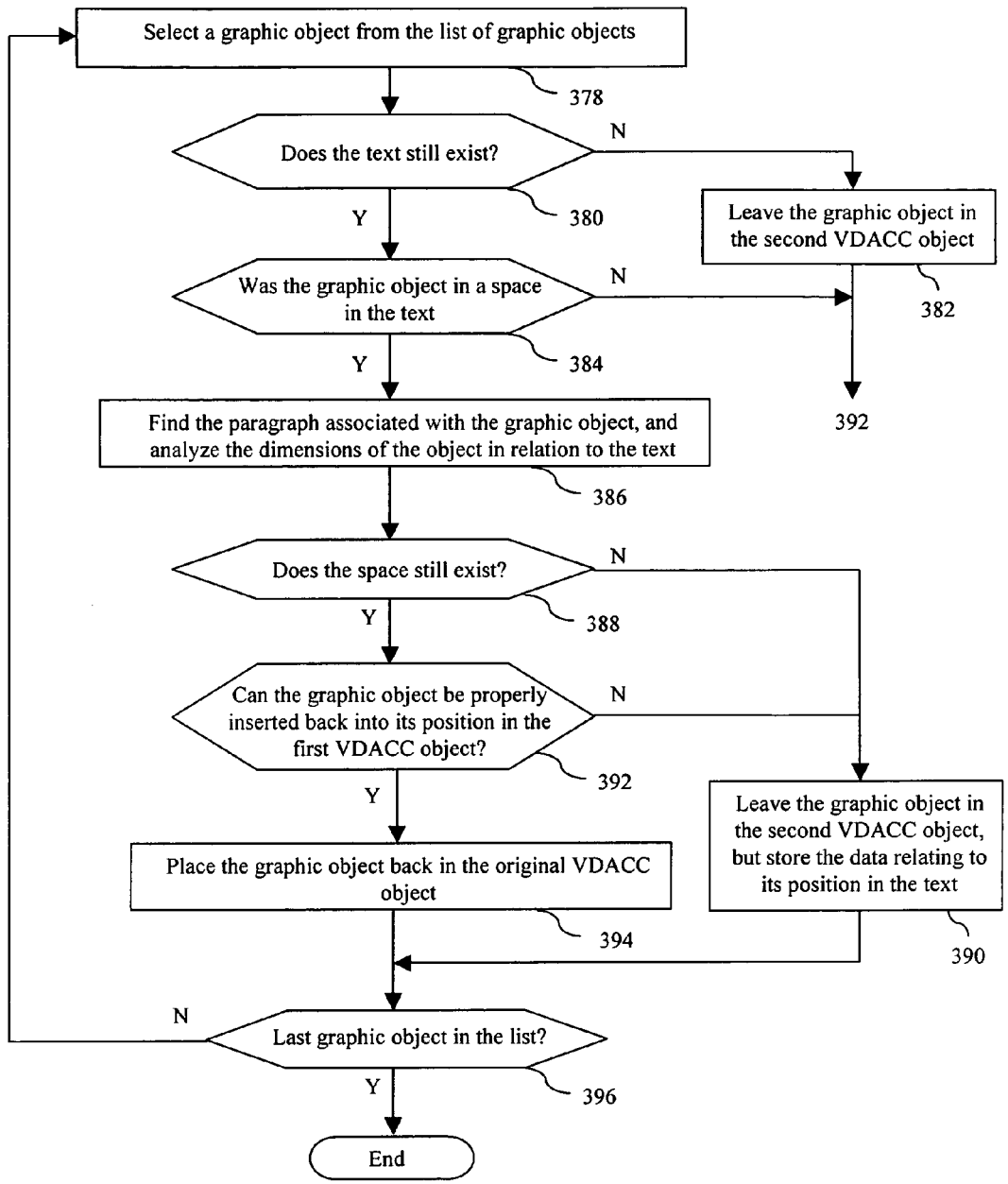
FIG. 14 is a flowchart of a process to place graphic objects in the duplicate VDACC object back into the original VDACC object in accordance with an embodiment of the invention.

FIG. 14 shows a flowchart of a process performed by the editing module 358 to place graphic objects in the duplicate VDACC object back into the original VDACC object in accordance with an embodiment of the invention. This process begins after the user has made the desired modifications to the electronic document in the original VDACC object and presses the primary switch of the EDIT switch. At block 378, a graphic object is selected from the list of graphic objects that are in the duplicate VDACC object. Next, at block 380, a determination is made whether the text still exists. If no, then the graphic object is left in the duplicate VDACC object, at block 382, and the process proceeds to block 392. If yes, then a determination is made whether the graphic object is in a space in the text, at block 384.

If the graphic object is not in a space in the text, then the process proceeds to block 392, since the graphic object is below the text. If the graphic object is in a space in the text, then the paragraph associated with the graphic object is found, and the dimensions of the graphic object in relation to the text is analyzed, at block 386. Next, at block 388, a determination is made whether the space in the text in the original VDACC object still exists. If no, then the graphic object is left in the duplicate VDACC object, but the data relating to its position in the text is stored, at block 390, and the process proceeds to block 396. If yes, then a determination is made whether the graphic object can be properly inserted back into its position in the original VDACC object, at block 392.

If the graphic object cannot be properly inserted back, then the process proceeds to block 390. If the graphic object can be properly inserted back, then the graphic object is placed back in the original VDACC object, at block 394. Next, at block 369, determination is made whether the graphic object is the last graphic object is in the list. If yes, then the process comes to an end. If no, then the process proceeds back to block 378 to select the next graphic object in the list.

In an alternative embodiment, the editing method in accordance with the invention may include a feature that divides or splits a graphic object when the graphic object is displaced, moved, or resized in such a way that a portion of the graphic object is positioned across a page break or into the top or bottom margin of a page. The movement of a graphic object may occur due to the Allow Ripple process, the activation of the EDIT switch to place the-graphic object back into the original VDACC object, or dragging of the graphic object with a mouse or its equivalent by the user. The graphic object may be a picture, a drawing, a chart or other graphics. The graphic object may also be a text object, i.e., an object comprised of text, that can be independently manipulated and altered with respect to other graphic objects, including other text objects. A text object could be equivalent to a "text box" that contains text in a conventional word processing or desktop publishing application.

In this alternative embodiment, graphic objects are not placed in a duplicate VDACC object. Rather, as the textual content of an electronic document is modified in the original VDACC object, a graphic object that encounters a page break or a margin is treated differently than a graphic object ends up being positioned within the main body of a page of the electronic document. As an example, when a graphic object is displaced across a page break, the part of the graphic object that is displaced over the page break appears on the adjacent page. Consequently, as a graphic object is further displaced across a page break, the part of the graphic object displayed on the adjacent page will increase. Thus, a graphic object in an electronic document can be made to appear to break apart and to move continuously and smoothly across a page break when the electronic document is being modified.

Figure 15:
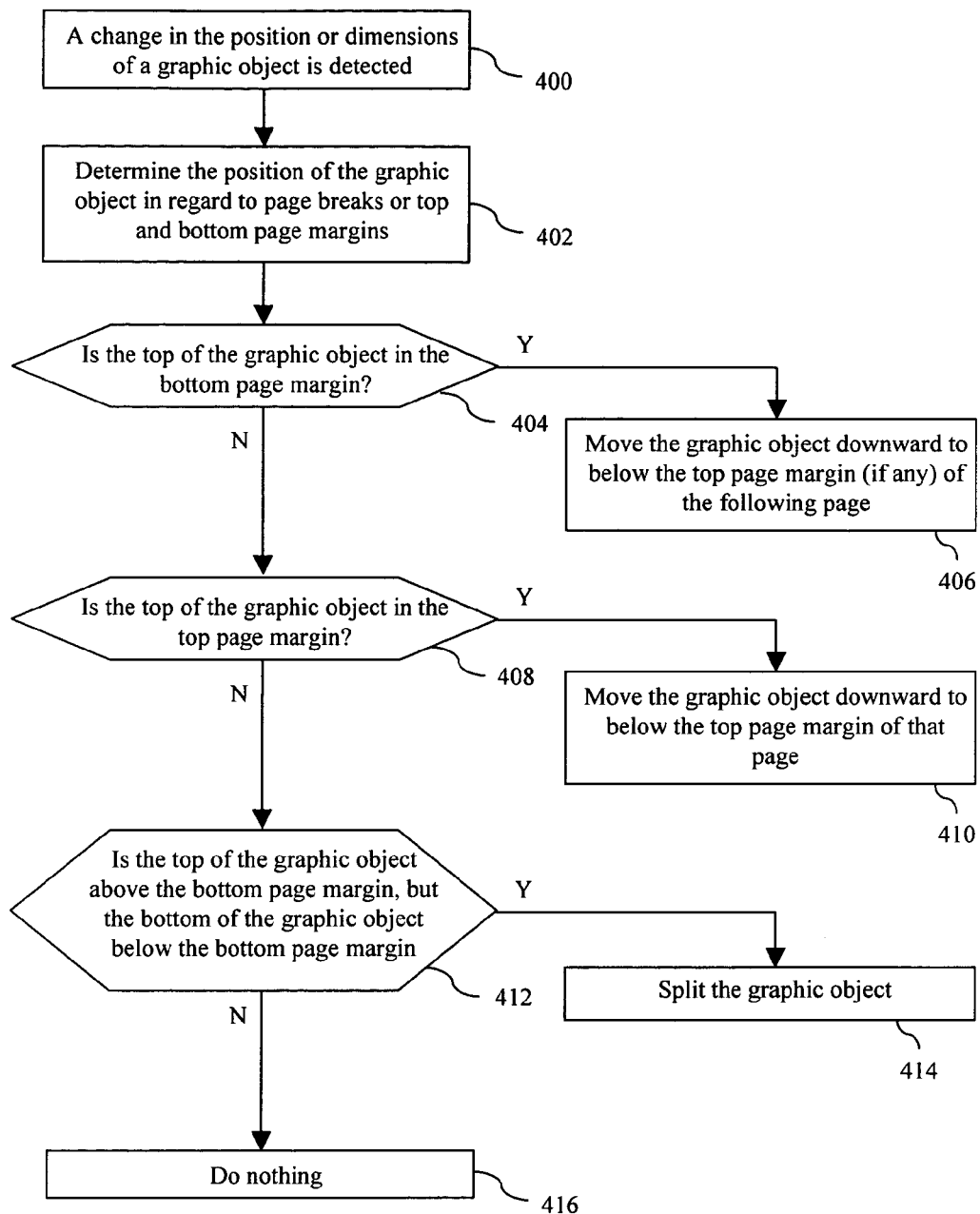
FIG. 15 is a flowchart of a process for splitting a graphic object in an electronic document in accordance with an embodiment of the invention.

FIG. 15 shows a flowchart of a process for splitting a graphic object in an electronic document in accordance with an alternative embodiment of the invention. At block 400, a change in the position or dimensions of the graphic object is detected. Next, at block 402, the position of the graphic object in regard to page breaks or top and bottom page margins is determined. Next, at block 404, a determination is made whether the top of the graphic object is in the bottom page margin. If yes, the graphic object is moved downward to below the top page margin (if any) of the following page, at block 406. If no, then the process proceeds to block 408.

At block 408, a determination is made whether the top of the graphic object is in the top page margin. If yes, the graphic object is moved downward to below the top page margin of that page, at block 410. If no, then the process proceeds to block 412, where another determination is made whether the top of the graphic object is above the bottom page margin, but the bottom of the graphic object is below the bottom page margin. If yes, the graphic object is split so that the top part is drawn between the top of the graphic object and the bottom margin of the page, and the remainder of the graphic object is drawn from the top margin of the following page, at block 414. The dimensions of the graphic object are increased to account for the space that now separates the two parts of the split graphic object. If no, then nothing is done.

Figure 16:
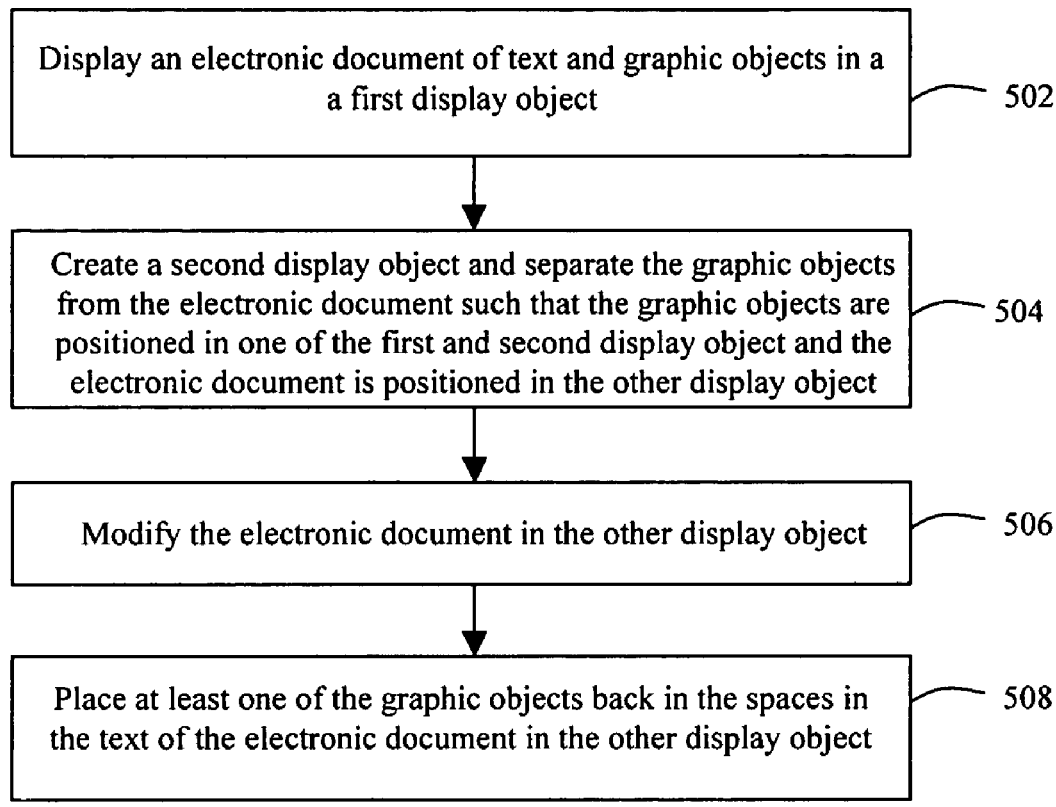
FIG. 16 is a process flow diagram of a method for editing an electronic document of text and graphic objects in a VDACC object in accordance with an embodiment of the invention.

A method for editing an electronic document of text and graphic objects in accordance with an embodiment of the invention is described with reference to a process flow diagram of FIG. 16. At block 502, the electronic document of text and graphic objects is displayed in a first display object, e.g., a VDACC object. The graphic objects are positioned in spaces in the text of the electronic document. Next, at block 504, a second display object is created. Furthermore, at block 504, the graphic objects are separated from the electronic document such that the graphic objects are positioned in one of the first and second display objects, e.g., the second display object, and the electronic document is positioned in the other display object, e.g., the first display object. Next, at block 506, the electronic document in the other display object is modified. For example, new text may be added to the electronic document or existing text may be deleted from the electronic document. Next, at block 508, at least one of the graphic objects is placed back in the spaces in the text of the electronic document in the other display object.

Figure 17:
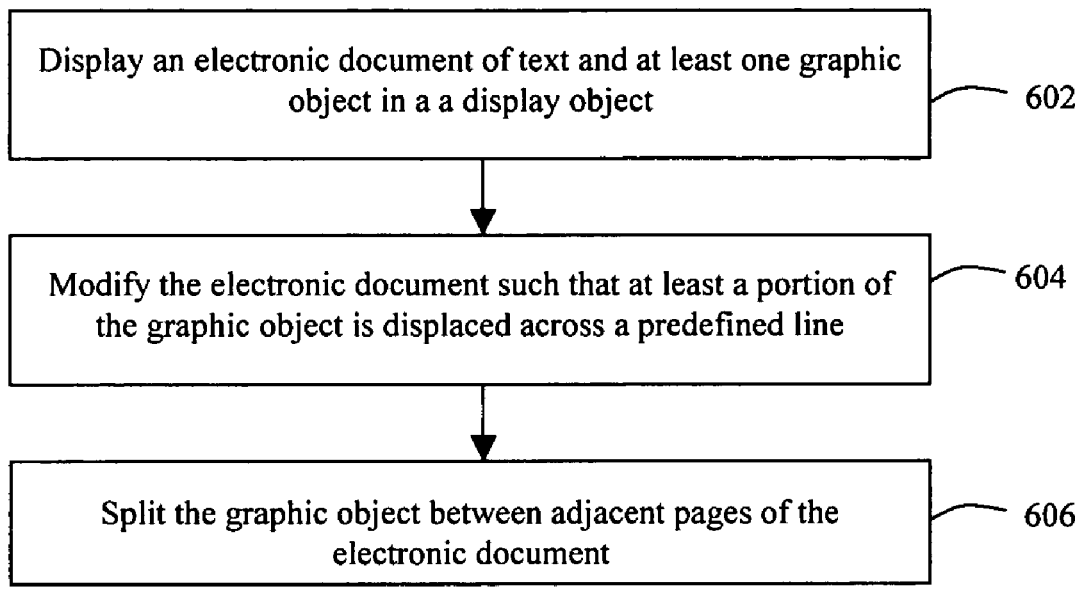
FIG. 17 is a process flow diagram of a method for editing an electronic document of text and graphic objects in a display object in accordance with an alternative embodiment of the invention.

A method for editing an electronic document of text and at least one graphic object in accordance with an alternative embodiment of the invention is described with reference to a process flow diagram of FIG. 17. At block 602, the electronic document is displayed in a display object, e.g., a VDACC object. Next, at block 604, the electronic document is modified such that at least a portion of the graphic object is displaced across a predefined line, which may be a page break or a line defining the top or bottom page margin. The predefined line may be an invisible line. Next, at block 606, the graphic is split between adjacent pages of the electronic document such that the portion of the graphic object that is displaced across the predefined line is positioned on one of the adjacent pages and the remaining portion of the graphic object is positioned on the other adjacent page.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

What is claimed is:

1. A method for editing an electronic document of text and graphic objects, said method comprising:

displaying said electronic document of said text and said graphic objects in a first display object, said graphic objects being positioned in spaces in said text;

automatically creating a second display object in response to at least one user input, including automatically separating said graphic objects from said electronic document in response to said at least one user input such that said graphic objects are positioned in one of said first and second display objects and said electronic document is positioned in the other display object of said first and second display objects;

modifying said electronic document in said other display object; and automatically placing at least one of said graphic objects back in said spaces in said text of said electronic document in said other display object in response to at least one other user input, wherein said automatically creating said second display object includes recording positional information of said graphic objects associated with said text and said first display object and wherein said recording said positional information includes recording vertical positions of said graphic objects relative to said text and horizontal positions of said graphic objects relative to said first display object.

2. The method of claim 1 wherein said modifying includes changing a particular space of said spaces in said text of said electronic document, and wherein said automatically placing includes automatically leaving a particular graphic object of said graphic objects in said one of said first and second display objects in response to said at least one other user input, said particular graphic object being originally positioned in said particular space in said text of said electronic document in said first display object.

3. The method of claim 2 wherein said changing includes changing the dimensions of said particular space such that said particular graphic object will no longer fit in said particular space.

4. The method of claim 3 wherein said changing of said dimensions of said particular space includes changing one of height and width of said particular space.

5. The method of claim 4 further comprising:
changing the dimensions of one of said particular graphic object and said particular space in response to user input such that said particular graphic object will now fit in said particular space; and
automatically placing said particular object in said particular space in said electronic document in said first display object by calculating the position of said particular object in said particular space according to the geometry of said particular object in said particular space in relation to said text surround said particular space in response to at least one additional user input.

6. The method of claim 2 wherein said changing includes moving said particular space across a page break such that said particular space is divided by said page break into divided portions.

7. The method of claim 6 further comprising:
moving said particular space in response to user input such that said particular space is not divided by said page break; and
automatically placing said particular object in said particular space in said electronic document in said first display object in response to at least one additional user input.

8. The method of claim 6 further comprising:
changing the dimensions of one of said divided portions in response to user input such that said particular graphic object will now fit in one of said divided portions; and
automatically placing said particular object in one of said divided spaces in said electronic document in said first display object by calculating the position of said particular object in one of said divided spaces according to the geometry of said particular object in said particular space in response to at least one additional user input.

9. A storage medium readable by a computer, tangibly embodying a program of instructions executable by said computer to perform method steps for editing an electronic document of text and graphic objects in a display object, said method steps comprising:

displaying said electronic document of said text and said graphic objects in a first display object, said graphic objects being positioned in spaces in said text;

automatically creating a second display object in response to at least one user input, including automatically separating said graphic objects from said electronic document in response to said at least one user input such that said graphic objects are positioned in one of said first and second display objects and said electronic document is positioned in the other display object of said first and second display objects;

modifying said electronic document in said other display object; and automatically placing at least one of said graphic objects back in said spaces in said text of said electronic document in said other display object in response to at least one other user input, wherein said automatically creating said second display object includes recording positional information of said graphic objects associated with said text and said first display object and wherein said recording said positional information includes recording vertical positions of said graphic objects relative to said text and horizontal positions of said graphic objects relative to said first display object.

10. The storage medium of claim 9 wherein said modifying includes changing a particular space of said spaces in said text of said electronic document, and wherein said automatically placing includes automatically leaving a particular graphic object of said graphic objects in said one of said first and second display objects in response to said at least one other user input, said particular graphic object being originally positioned in said particular space in said text of said electronic document in said first display object.

11. The storage medium of claim 10 wherein said changing includes changing the dimensions of said particular space such that said particular graphic object will no longer fit in said particular space.

12. The storage medium of claim 11 wherein said changing of said dimensions of said particular space includes changing one of height and width of said particular space.

13. The storage medium of claim 12, wherein the method steps further comprises:
changing the dimensions of one of said particular graphic object and said particular space in response to user input such that said particular graphic object will now fit in said particular space; and
automatically placing said particular object in said particular space in said electronic document in said first display object in response to at least one additional user input.

14. The storage medium of claim 10 wherein said changing includes moving said particular space across a page break such that said particular space is divided by said page break into divided portions.

15. The storage medium of claim 14, wherein the method steps further comprises:
moving said particular space in response to user input such that said particular space is not divided by said page break; and
automatically placing said particular object in said particular space in said electronic document in said first display object in response to at least one additional user input.

16. The storage medium of claim 14, wherein the method steps further comprises:
  changing the dimensions of one of said divided portions in response to user input such that said particular graphic object will now fit in one of said divided portions; and
  automatically placing said particular object in one of said divided portions in said electronic document in said first display object in response to at least one additional user input.

17. A system for editing an electronic document of text and graphic objects, said system comprising:
  a display device to display said electronic document of said text and said graphic objects in a first display object, said graphic objects being positioned in spaces in said text; and
  an editing module operatively coupled to said display device, said editing module being configured to automatically create a second display object and separate said graphic objects from said electronic document in response to at least one user input such that said graphic objects are positioned in one of said first and second display objects and said electronic document is positioned in the other display object of said first and second display objects, said editing module being further configured to automatically place at least one of said graphic objects back in said spaces in said text of said electronic document in response to at least one other user input after said electronic document has been modified,
  wherein said editing module is configured to record positional information of said graphic objects associated with said text and said first display object to create said second display object, said positional information of said graphic objects including vertical positions of said graphic objects relative to said text and horizontal positions of said graphic objects relative to said first display object.

18. The system of claim 17 wherein said editing module is configured to automatically leave a particular graphic object of said graphic objects in said one of said first and second display objects in response to said at least one other user input when a corresponding space in said text of said electronic document in said other display object has been changed such that said particular graphic object will no longer fit in said corresponding space.

19. The system of claim 18 wherein said editing module is configured to automatically place said particular graphic object in said corresponding space in response to at least one additional user input when said corresponding space has been changed such that said particular graphic object will now fit in said corresponding space.

20. The system of claim 18 wherein said editing module is configured to automatically leave said particular graphic object in said one of said first and second display objects in response to said at least one other user input when said corresponding space in said text of said electronic document in said other display object has been divided into divided portions by a page break such that said particular graphic object will not fit in one of said divided portions.

21. The system of claim 20 wherein said editing module is configured to automatically place said particular graphic object in said corresponding space in response to at least one additional user input when said particular space is moved in response to user input such that said particular space is not divided by said page break.

22. The system of claim 20 wherein said editing module is configured to automatically place said particular graphic object in a selected portion of said divided portions in response to at least one additional user input when the dimensions of said selected portion are changed in response to user input such that said particular graphic object will now fit in said selected portion.

23. The method of claim 1 wherein said automatically creating said second display object includes recording positional information of said spaces associated with said text and said first display object.

24. The method of claim 23 wherein said recording positional information includes creating a marker associated with each of said spaces associated with said text and said first display object.

25. The method of claim 1 wherein said automatically creating said second display object includes recording geometrical information of said spaces associated with said text and said first display object.

26. The method of claim 1 wherein said recording said positional information includes recording information that correlates said graphic objects with said spaces.

27. The method of claim 1 wherein said automatically creating said second display object includes recording geometrical information of said graphic objects associated with said text and said first display object.

\* \* \* \* \*